United States Patent
Ding et al.

(10) Patent No.: US 6,564,174 B1
(45) Date of Patent: May 13, 2003

(54) ENTERPRISE MANAGEMENT SYSTEM AND METHOD WHICH INDICATES CHAOTIC BEHAVIOR IN SYSTEM RESOURCE USAGE FOR MORE ACCURATE MODELING AND PREDICTION

(75) Inventors: Yiping Ding, Dover, MA (US); Pierre Fiorini, Nashua, NH (US)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 09/408,085

(22) Filed: Sep. 29, 1999

(51) Int. Cl.[7] .............................................. G06F 15/00
(52) U.S. Cl. ...................... 702/186; 702/187; 702/188; 370/252; 709/224
(58) Field of Search ................................ 702/186, 187, 702/188; 709/223, 224, 225, 226; 370/229, 235, 254, 241, 252; 706/25

(56) References Cited

U.S. PATENT DOCUMENTS 6,311,175 B1    10/2001    Adriaans et al.

*Primary Examiner*—John Barlow
*Assistant Examiner*—Hien Vo

(74) *Attorney, Agent, or Firm*—Wong, Cabello, Lutsch, Rutherford & Brucculeri, L.L.P.

(57) ABSTRACT

A set of algorithms for detecting a renewal power-tail behavior which often relates to chaotic system activities in one or more computer system resources of a distributed computing environment, i.e., an enterprise. Analysis and/or prediction software receives a set of metric data points from agent software on one or more computer systems. The analysis and/or prediction software performs three analytic tests relating to distinctive properties of power-tail distributions: a first test to determine whether the set of data points exhibits large deviations from the mean, a second test to determine whether the set of data points exhibits a high variance, and a third test to determine whether the set of the largest data points exhibits properties consistent with large values in a tail portion of a power-tail distribution. The tests can be performed in any order, and in other embodiments, fewer than three can be performed. Each test has two possible results: successful if the test indicates a likelihood of power-tail behavior, or unsuccessful if it indicates that power-tail behavior is unlikely. The results of the three tests are combined to determine the overall likelihood of a power-tail distribution. If all three tests are successful, then power-tail behavior is likely. If all three tests are unsuccessful, then power-tail behavior is unlikely. If the results are mixed, then typically more data or analysis is needed. The results are used for modeling and/or altering the configuration of the enterprise.

73 Claims, 16 Drawing Sheets

| $I_n$ | $A_1$ | $A_2$ | $A_3$ | Interpretation: |
|---|---|---|---|---|
| $I_1$ | S | S | S | Suggests $D$ is power-tail distributed |
| $I_2$ | S | S | U | Variance consistent with power-tail; however, may not be power-tailed due to behavior of distribution's tail |
| $I_3$ | S | U | S | $D$ may be power-tailed due to large deviations and tail behavior; more data is necessary |
| $I_4$ | S | U | U | Variance and tail behavior not consistent with power-tail; $A_1$ may have detected an outlier |
| $I_5$ | U | S | S | $A_3$ detects tail behavior consistent with power-tails; however, more data is necessary |
| $I_6$ | U | S | U | Unclear; more data analysis is necessary |
| $I_7$ | U | U | S | $A_3$ detects tail behavior consistent with power-tails; however, more data is necessary |
| $I_8$ | U | U | U | Suggests $D$ is not power-tail distributed |

FIG. 16

ENTERPRISE MANAGEMENT SYSTEM AND METHOD WHICH INDICATES CHAOTIC BEHAVIOR IN SYSTEM RESOURCE USAGE FOR MORE ACCURATE MODELING AND PREDICTION

BACKGROUND OF THE INVENTION

1. Field of the Invention

The present invention relates to the collection, analysis, and management of system resource data in distributed or enterprise computer systems, and particularly to the modeling and analysis of system resources and prediction of system performance.

2. Description of the Related Art

The data processing resources of business organizations are increasingly taking the form of a distributed computing environment in which data and processing are dispersed over a network comprising many interconnected, heterogeneous, geographically remote computers. Such a computing environment is commonly referred to as an enterprise computing environment, or simply an enterprise. Managers of the enterprise often employ software packages known as enterprise management systems to monitor, analyze, and manage the resources of the enterprise. Enterprise management systems may provide for the collection of measurements, or metrics, concerning the resources of individual systems. For example, an enterprise management system might include a software agent on an individual computer system for the monitoring of particular resources such as CPU usage or disk access. The enterprise management agent might periodically collect metric data and write to a data repository containing historical metric data, i.e., metric data previously collected over a period of time. This metric data can be used to create models of one or more computer systems in the enterprise for modeling, analysis, and prediction of system performance. As network-based client/server models have become more popular in enterprise-wide computing infrastructures, however, the associated performance issues have become more sophisticated and complicated as well.

The increasing complexity of computer systems and inherent limitations in hardware and software are fertile ground for the effects of chaotic behavior. Chaos is the unpredictable behavior of dynamical systems. When resource utilization is low, the system limitations are avoided or not exposed, and chaotic behavior is usually not a problem. However, when utilization is moderate to high, then system limits are reached. Common limitations include hardware limitations such as memory space and disk size and software limitations such as fixed buffer sizes and string lengths. When these system limits are reached, computer systems are more likely to break down and/or behave chaotically. The impact of chaotic behavior on the performance of a computer system can be enormous. In software, problems such as infinite loops, memory leaks, network waiting time-outs, and runaway processes often cause serious performance problems and even system shutdowns. Over time, for example, applications with memory leaks eventually use up most or all of available memory. Consequently, the I/O or paging subsystem is saturated with excessive paging, and the system's perceived processing power is reduced. Hardware glitches can also cause performance degradation. For example, when a network segment failure causes traffic to be routed through other segments, utilization increases on the other segments, and chaotic behavior may arise.

Typically, computer performance modeling has used the exponential assumption to model system behavior. Recently, however, the exponential assumption has come under scrutiny. Research has shown that some performance measurements, such as process service times and network traffic, are more chaotic than had been previously assumed. For instance, many recent empirical studies have suggested that UNIX CPU process lifetimes, disk file sizes, World Wide Web (WWW) file transfer sizes, and network traffic exhibit properties consistent with heavy-tailed or power-tailed (PT) distributions rather than exponential distributions. See, for example, W. E. Leland, M. S. Taqqu, W. Willinger, and D. V. Wilson, "On the Self-Similar Nature of Ethernet Traffic (Extended Version)," *IEFE/ACM Trans. Networking*, Vol. 2, No. 1, pp. 1–15, 1994; M. Crovella and A. Bestavros, "Self-Similarity in World Wide Web Traffic: Evidence and Possible Causes," *In Proceedings of SIGMETRICS Conference on Measurement and Modeling of Computer Systems*, 1996; M. Greiner, M. Jobmann, and L. Lipsky, "The Importance of Power-Tail Distributions for Telecommunications Traffic Models," *Operations Research*, 1999. Power-tail distributions, unlike exponential distributions, exhibit very "bursty" and "chaotic" behavior. Power-tail distributions are defined in the Glossary in the Detailed Description.

Power-tail distributions can explain many modeling and performance problems that have been considered "exceptional" in the past. When an exponential distribution is assumed to be present, performance predictions may be overly optimistic. This could mislead capacity planners in their decision-making and adversely affect QoS (Quality of Service) of end-users. Nevertheless, existing tools for the analysis and prediction of performance are unable to construct models that account for the significant performance ramifications of chaotic behavior. Previous research into the identification of power-tail phenomena has focused on techniques to access a particular property of power-tail distribution. At present, there are no known "generic" and efficient tests, algorithms, or methods in the prior art to identify whether or not independent and identically distributed random variables are power-tail distributed, which is one of the causes of chaotic behavior in enterprise-wide computer systems.

For the foregoing reasons, there is a need for accurate detection of chaotic or power-tailed behavior in computer systems.

SUMMARY OF THE INVENTION

The problems outlined above are in large part solved by various embodiments of a system and method for accurately and efficiently detecting chaotic or power-tailed behavior in computer systems. In one embodiment, the system and method are used in a distributed computing environment, i.e., an enterprise. The enterprise comprises a plurality of computer systems, or nodes, which are interconnected through a network. At least one of the computer systems is a monitor computer system from which a user may monitor the nodes of the enterprise. At least one of the computer systems is an agent computer system. An agent computer system includes agent software that permits the collection of data relating to one or more metrics, i.e., measurements of system resource usage on the agent computer system.

In one embodiment, analysis and/or prediction software receives a set of data points from agent software on one or more computer systems, wherein the set of data points represents a series of metrics. The data points are assumed to be independent and identically distributed. The analysis and/or prediction software determines whether there is a renewal power-tail behavior in the set of data points by performing two or more analytic tests on the set of data points and then combining the results of the analytic tests to determine an overall likelihood of power-tail or chaotic behavior.

In a preferred embodiment, three analytic tests are performed: a first test to determine whether the largest sample of a set of data points exhibits large deviations from the mean, a second test to determine whether the set of data points exhibits a high variance, and a third test to determine whether the set of the largest data points exhibits properties consistent with large values in the tail portion of the power-tail distribution. The tests detect whether or not distinctive properties of a power-tail distribution are present in the set of data points. The tests can be performed in any order, and in other embodiments, fewer than three can be performed. Each test has two possible results: successful if the test indicates a likelihood of power-tail behavior, or unsuccessful if it indicates that power-tail behavior is unlikely. The results of the first analytic test, the second analytic test, and the third analytic test are then combined and compared with one another to determine the overall likelihood of a power-tail distribution in the set of data points.

In one embodiment, the first analytic test is performed by an algorithm for determining whether the largest sample in a set of data points exhibits large deviations from the mean. The largest order statistic or an approximation thereof, i.e., the substantially largest data point of the set of data points, is determined. The probability $P_D$ that a random variable X is greater than or equal to the substantially largest data point is computed. The probability $P_E$ that a random variable X is greater than or equal to the expected value of the substantially largest order statistic from the exponential distribution is computed. An arbitrarily small tolerance factor is determined. The final step of the first algorithm is to determine if the probability $P_D$ is substantially less than or equal to the tolerance factor and the probability $P_D$ is less than or equal to the probability $P_E$. If the answer to the final step is affirmative, then the first test is successful. If the answer is negative, then the first test is unsuccessful.

In one embodiment, the second analytic test is performed by an algorithm for determining whether the set of data points exhibits a high variance. The power-tail variance index for a power-tail distribution with a power-tail index $\alpha$ of 2 is computed. The variance of the set of data points is computed. The final step of the second algorithm is to determine if the variance of the set of data points is greater than or equal to the power-tail variance index. If the answer to the final step is affirmative, then the second test is successful. If the answer is negative, then the second test is unsuccessful.

In one embodiment, the third analytic test is performed by an algorithm for determining whether the set of the largest data points exhibits properties consistent with large values in the tail portion of the power-tail distribution. The set of data points is normalized such that the expected value of the set of data points is 1. As in the first algorithm, the substantially largest data point of the set of data points is determined. The power-tail index $\alpha$ of the set of data points is estimated. The final step of the third algorithm is to determine if the power-tail index $\alpha$ of said set of data points is less than 2. If the answer to the final step is affirmative, then the third test is successful. If the answer is negative, then the third test is unsuccessful.

When three tests are performed, there are eight possible outcomes of the combined tests (or $2^3$ outcomes). If all three tests are successful, then the analysis and/or prediction software concludes that power-tail behavior is likely. If all three tests are unsuccessful, then the analysis and/or prediction software concludes that power-tail behavior is unlikely. If the results are a combination of successful and unsuccessful (i.e., 2 successful and 1 unsuccessful or 1 successful and 2 unsuccessful), then typically more data or analysis is needed to arrive at a conclusion.

In response to the detection or non-detection of chaotic or power-tailed behavior of one or more computer systems or networks in the enterprise, the system and method are operable to use this information in modeling and/or analyzing the enterprise. In various embodiments, the modeling and/or analyzing may further comprise one of more of the following: displaying the detection or non-detection of the power-tail distribution to a user, predicting future performance, graphing a performance prediction, generating reports, asking a user for further data, permitting a user to modify a model of the enterprise, and altering a configuration of the enterprise in response to the detection or non-detection of the power-tail distribution.

BRIEF DESCRIPTION OF THE DRAWINGS

A better understanding of the present invention can be obtained when the following detailed description of the preferred embodiment is considered in conjunction with the following drawings, in which:

FIG. 16 is a table illustrating interpretations of the eight possible outcomes of the three tests in one embodiment.

DETAILED DESCRIPTION OF THE PREFERRED EMBODIMENTS

Glossary

Figure 1:
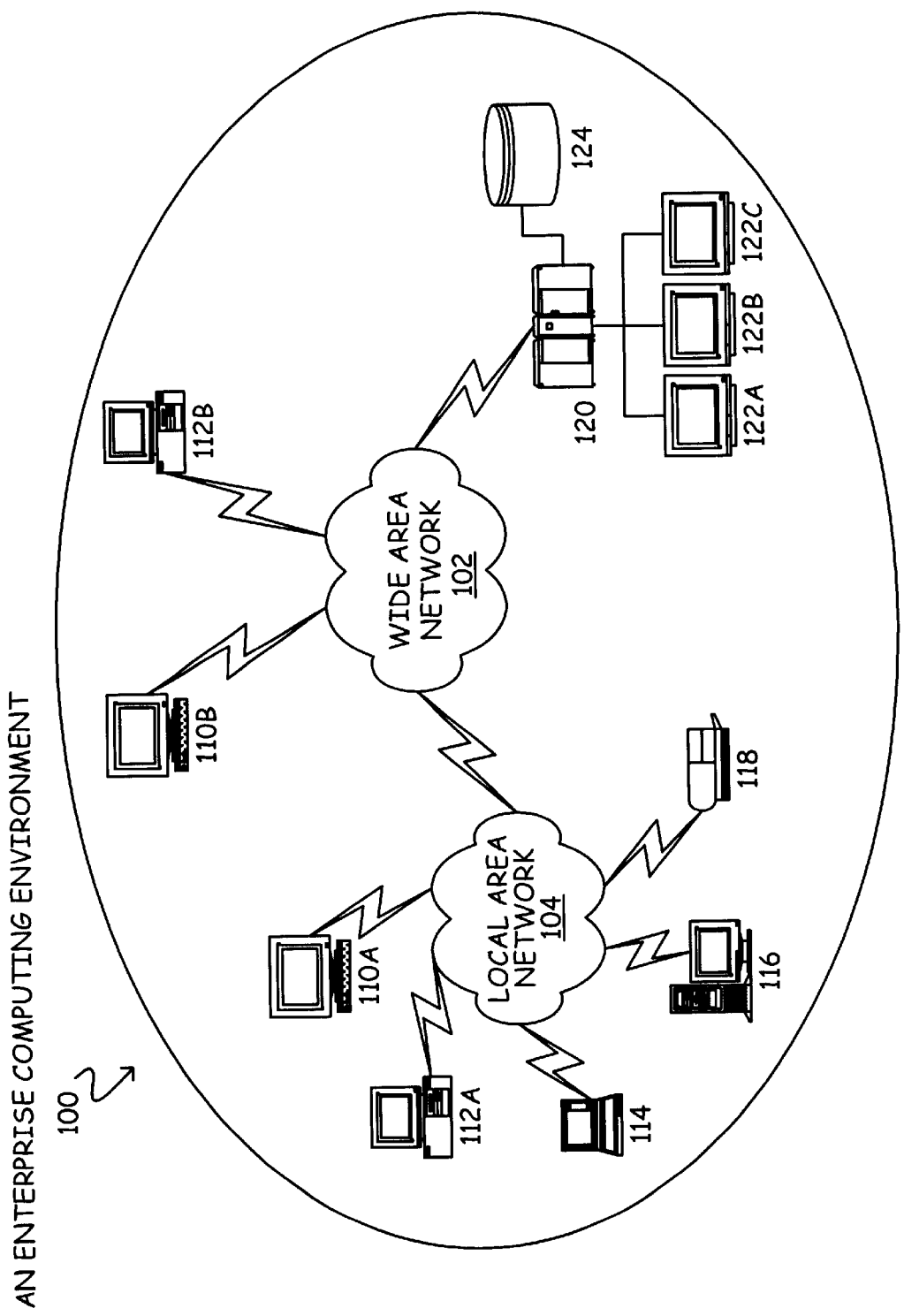
FIG. 1 is a network diagram of an illustrative enterprise computing environment.

Cumulative distribution function (c.d.f.): A function F(x) that gives the probability that a random variable X is less than or equal to a particular point x. In other terms, $F(x)=P(X \leq x)$. $F(x)$ is monotonically increasing. The c.d.f. is also known as the probability distribution function (P.D.F.).

Expected value: The mean or average $E(X)$ for a continuous random variable X with probability density function $f(x)$.

Exponential distribution: A distribution having the p.d.f. $f(x|\lambda)=\lambda e^{-\lambda x}$, $x>0$, and c.d.f $F(x|\lambda)=1-e^{-\lambda x}$, $x>0$.

Non-renewal process: A process comprising data points that are related or correlated with one another.

Order statistic: The order statistics of a random sample $X_{(1)}, \ldots, X_{(n)}$ are the sample values placed in ascending order. They are denoted by $X_{(1)}, \ldots, X_{(n)}$. In the ordered list $[X_{(1)}, \ldots, X_{(n)}]$, the smallest order statistic is $X_{(1)}$ and the largest order statistic is $X_{(n)}$.

Power-law: An expression of the form $$f(x) = \frac{c}{x^\alpha},$$

where c and $\alpha>0$ are constants. Power-laws are self-similar: in other words, if x is re-scaled (i.e., multiplied by a constant), then $f(x)$ is still proportional to $x^{-\alpha}$ with a different constant of proportionality. Power-laws can be used to model chaotic behavior.

Power-tail: Power-tail distributions are also known as "heavy-tailed" distributions. A reliability function for a power-tail distribution is of the form $$R(x) = \frac{c}{x^\alpha},$$

where c and $\alpha>0$ are constants. A probability density function associated with such a reliability function possesses infinite variance for $0<\alpha<2$. Probability density functions that exhibit infinite variance are very "bursty" and "chaotic" in behavior. The smaller the value of $\alpha$, the burstier and more chaotic the behavior.

Probability density function (p.d.f.): A function $f(x)$ that gives the density or concentration of probability of a continuous random variable X at a particular point x, where $f(x)=F'(x)$ for a cumulative distribution function $F(x)$.

Queue: A line of things, such as events, waiting to be handled. A queue can be described in a notation such as G/G/1 or M|M/1. The first element of the notation is the arrival distribution, the second element is the departure or service distribution, and the third element defines the number of parallel service channels (i.e., the number of queues). "G" indicates a general interarrival or service time distribution. "M" indicates a Markov or exponential process that exhibits the "memoryless" property.

Reliability function: A function $R(x)$ which is the complement of the cumulative distribution function $F(x)$, such that $R(x)=P(X \geq x)=1-F(x)$. A reliability function for a power-law is of the form $$R(x) = \frac{c}{x^\alpha},$$

where c and $\alpha>0$ are constants.

Renewal process: A process comprising data points that are unrelated or uncorrelated with one another.

Response time: Service time plus wait time in a queueing system.

FIG. 1 illustrates an enterprise computing environment according to one embodiment of the present invention. An enterprise 100 comprises a plurality of computer systems which are interconnected through one or more networks. Although one particular embodiment is shown in FIG. 1, the enterprise 100 may comprise a variety of heterogeneous computer systems and networks which are interconnected in a variety of ways and which run a variety of software applications.

One or more local area networks (LANs) 104 may be included in the enterprise 100. A LAN 104 is a network that spans a relatively small area. Typically, a LAN 104 is confined to a single building or group of buildings. Each node (i.e., individual computer system or device) on a LAN 104 preferably has its own CPU with which it executes programs, and each node is also able to access data and devices anywhere on the LAN 104. The LAN 104 thus allows many users to share devices (e.g., printers) as well as data stored on file servers. The LAN 104 may be characterized by any of a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, radio waves). As illustrated in FIG. 1, the enterprise 100 includes one LAN 104. However, in alternate embodiments the enterprise 100 may include a plurality of LANs 104 which are coupled to one another through a wide area network (WAN) 102. A WAN 102 is a network that spans a relatively large geographical area.

Each LAN 104 comprises a plurality of interconnected computer systems and optionally one or more other devices: for example, one or more workstations 110a, one or more personal computers 112a, one or more laptop or notebook computer systems 114, one or more server computer systems 116, and one or more network printers 118. As illustrated in FIG. 1, the LAN 104 comprises one of each of computer systems 110a, 112a, 114, and 116, and one printer 118. The LAN 104 may be coupled to other computer systems and/or other devices and/or other LANs 104 through a WAN 102.

One or more mainframe computer systems 120 may optionally be coupled to the enterprise 100. As shown in FIG. 1, the mainframe 120 is coupled to the enterprise 100 through the WAN 102, but alternatively one or more mainframes 120 may be coupled to the enterprise 100 through one or more LANs 104. As shown, the mainframe 120 is coupled to a storage device or file server 124 and mainframe terminals 122a, 122b, and 122c. The mainframe terminals 122a, 122b, and 122c access data stored in the storage device or file server 124 coupled to or comprised in the mainframe computer system 120.

The enterprise 100 may also comprise one or more computer systems which are connected to the enterprise 100 through the WAN 102: as illustrated, a workstation 110b and a personal computer 112b. In other words, the enterprise 100 may optionally include one or more computer systems which are not coupled to the enterprise 100 through a LAN 104. For example, the enterprise 100 may include computer systems which are geographically remote and connected to the enterprise 100 through the Internet.

Figure 2:
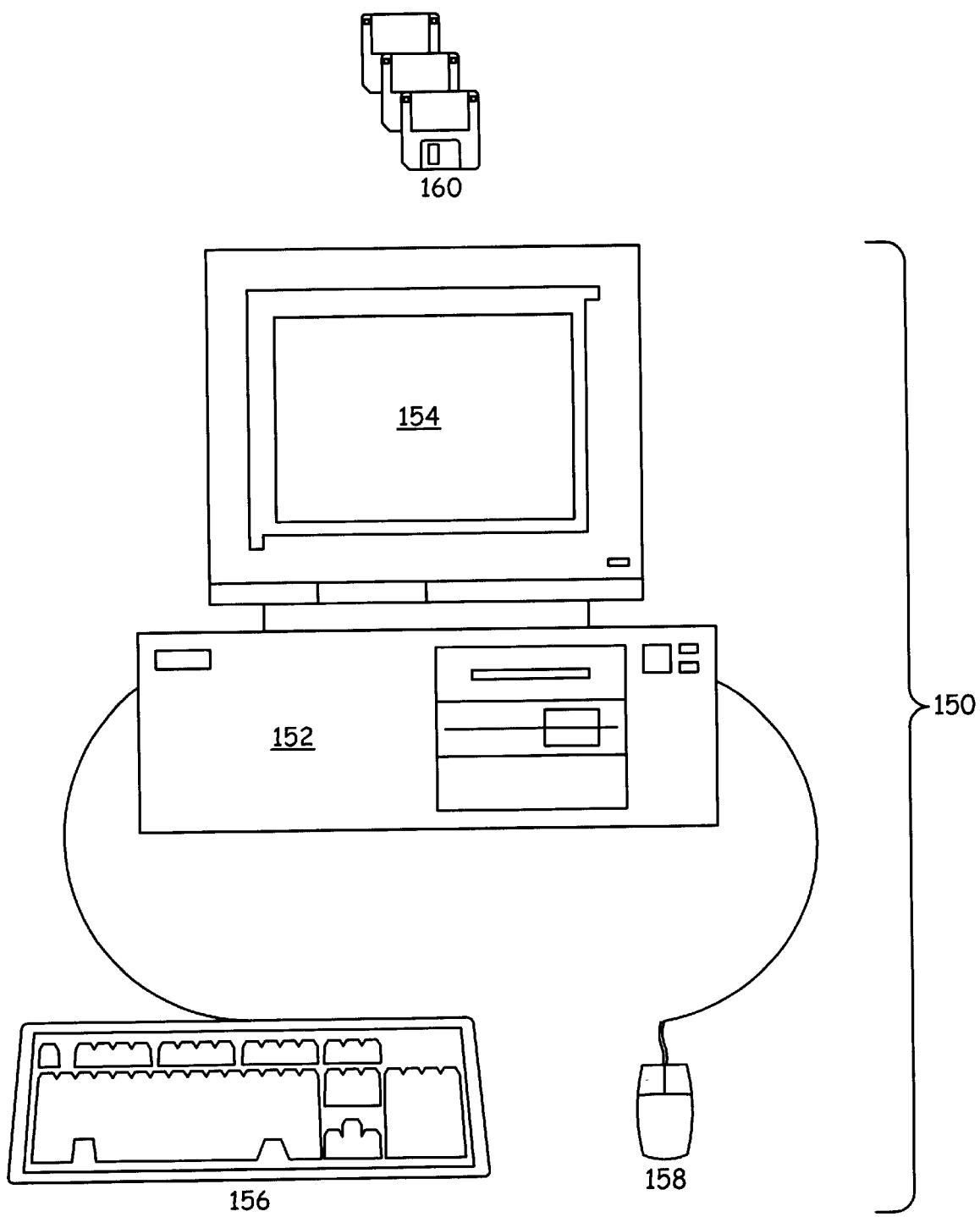
FIG. 2 is an illustration of a typical computer system with computer software programs.

The present invention preferably comprises computer programs 160 stored on or accessible to each computer system in the enterprise 100. FIG. 2 illustrates computer programs 160 and a typical computer system 150. Each computer system 150 typically comprises components such as a CPU 152, with an associated memory media. The memory media stores program instructions of the computer programs 160, wherein the program instructions are executable by the CPU 152. The memory media preferably comprises a system memory such as RAM and/or a nonvolatile memory such as a hard disk. The memory media may also comprise an installation medium, such as one or more floppy disks, a CD-ROM, or a memory involved in distributing software over a network, such as the Internet. The memory media may also be referred to as storage media. The computer system 150 further comprises a display device such as a monitor 154, an alphanumeric input device such as a keyboard 156, and optionally a directional input device such as a mouse 158. The computer system 150 is operable to execute computer programs 160.

When the computer programs are executed on one or more computer systems 150, an enterprise management system 180 is operable to monitor, analyze, and manage the computer programs, processes, and resources of the enterprise 100. Each computer system 150 in the enterprise 100 executes or runs a plurality of software applications or processes. Each software application or process consumes a portion of the resources of a computer system and/or network: for example, CPU time, system memory such as RAM, nonvolatile memory such as a hard disk, network bandwidth, and input/output (I/O). The enterprise management system 180 permits users to monitor, analyze, and manage resource usage on heterogeneous computer systems 150 across the enterprise 100.

Figure 3:
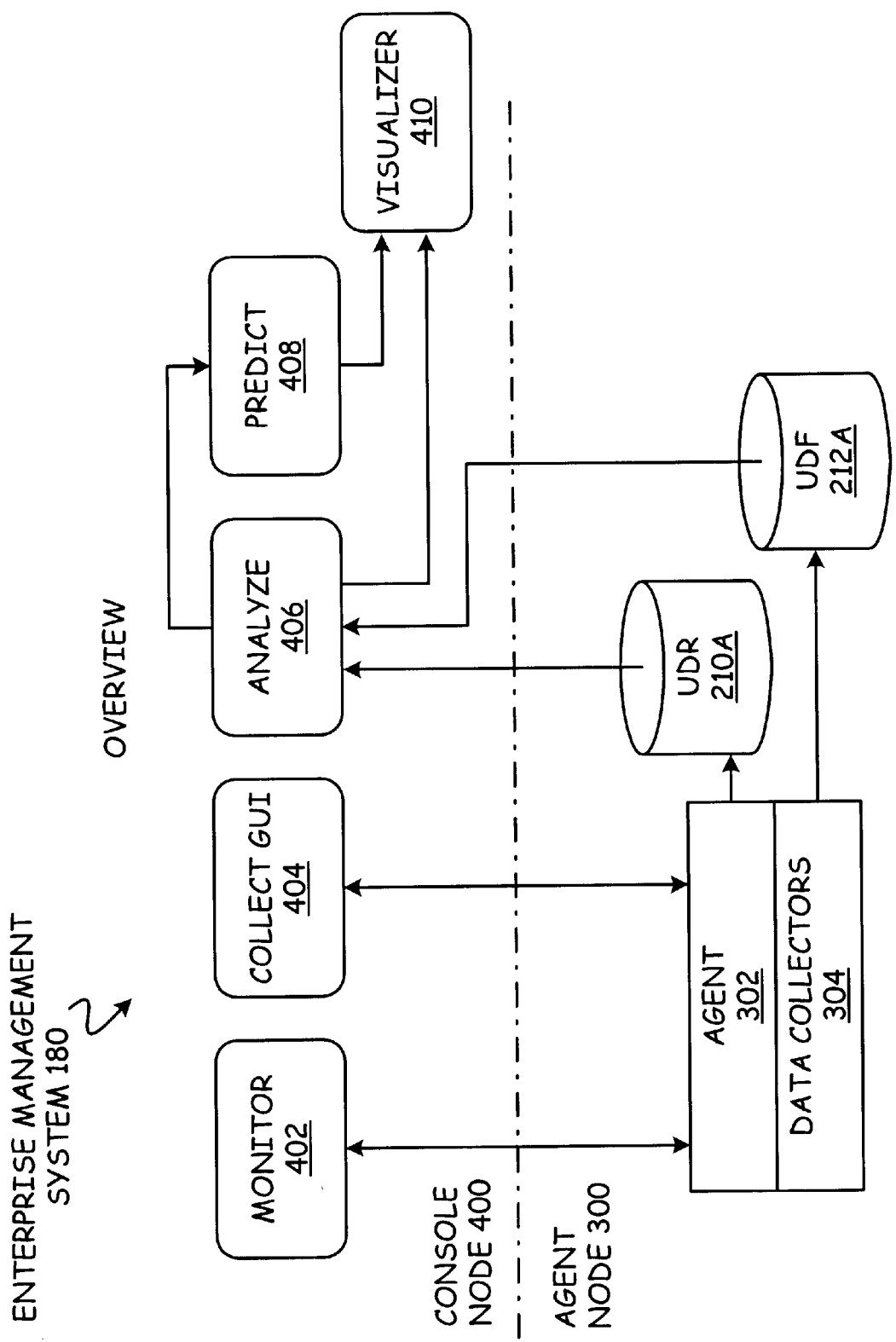
FIG. 3 is a block diagram illustrating an overview of the enterprise management system according to one embodiment.

FIG. 3 shows an overview of the enterprise management system 180. The enterprise management system 180 includes at least one console node 400 and at least one agent node 300, but it may include a plurality of console nodes 400 and/or a plurality of agent nodes 300. In general, an agent node 300 executes software to collect metric data on its computer system 150, and a console node 400 executes software to monitor, analyze, and manage the collected metrics from one or more agent nodes 300. A metric is a measurement of a particular system resource. For example, in the preferred embodiment, the enterprise management system 180 collects metrics such as CPU utilization, disk I/O counts (number of reads/writes), file system usage, database usage, number of threads, number of processes, kernel version, registry type, logical volume size, and paging I/O count. Each computer system 150 in the enterprise 100 may comprise a console node 400, an agent node 300, or both a console node 400 and an agent node 300. In the preferred embodiment, server computer systems include agent nodes 300, and other computer systems may also comprise agent nodes 300 as desired, e.g., file servers, print servers, e-mail servers, and internet servers. The console node 400 and agent node 300 are characterized by an end-by-end relationship: a single console node 400 may be linked to a single agent node 300, or a single console node 400 may be linked to a plurality of agent nodes 300, or a plurality of console nodes 400 may be linked to a single agent node 300, or a plurality of console nodes 400 may be linked to a plurality of agent nodes 300.

In the preferred embodiment, the console node 400 comprises four user-visible components: a Monitor component 402, a Collect graphical user interface (GUI) 404, an Analyze component 406, and a Predict component 408. In one embodiment, all four components 402, 404, 406, and 408 of the console node 400 are part of the "BEST/1 FOR DISTRIBUTED SYSTEMS" software package or the "PATROL" software package, all available from BMC Software, Inc. The agent node 300 comprises an Agent 302, one or more data collectors 304, Universal Data Repository (UDR) history files 210a, and Universal Data Format (UDF) history files 212a. In alternate embodiments, the agent node 300 includes either of UDR 210a or UDF 212a, but not both. The Monitor component 402 allows a user to monitor, in real time, data that is being collected by an Agent 302 and being sent to the Monitor 402. The Collect GUI 404 is employed to schedule data collection on an agent node 302. The Analyze component 406 takes historical data from a UDR 210a and/or UDF 212a to create a model of the enterprise 100. The Predict component 408 takes the model from the Analyze component 406 and allows a user to alter the model by specifying hypothetical changes to the enterprise 100. Analyze 406 and Predict 408 can create output in a format which can be understood and displayed by a Visualizer tool 410. In the preferred embodiment, Visualizer 410 is the "BEST/1-VISUALIZER" available from BMC Software, Inc. In one embodiment, Visualizer 410 is also part of the console node 400.

The Agent 302 controls data collection on a particular computer system and reports the data in real time to one or more Monitors 402. In the preferred embodiment, the Agent 302 is the part of the "BEST/1 FOR DISTRIBUTED SYSTEMS" software package available from BMC Software, Inc. The data collectors 304 collect data from various processes and subsystems of the agent node 300. The Agent 302 sends real-time data to the UDR 210a, which is a database of historical data in a particular data format. The UDF 212a is similar to the UDR 210a, but the UDF 212a uses an alternative data format and is written directly by the data collectors 304.

Figure 4:
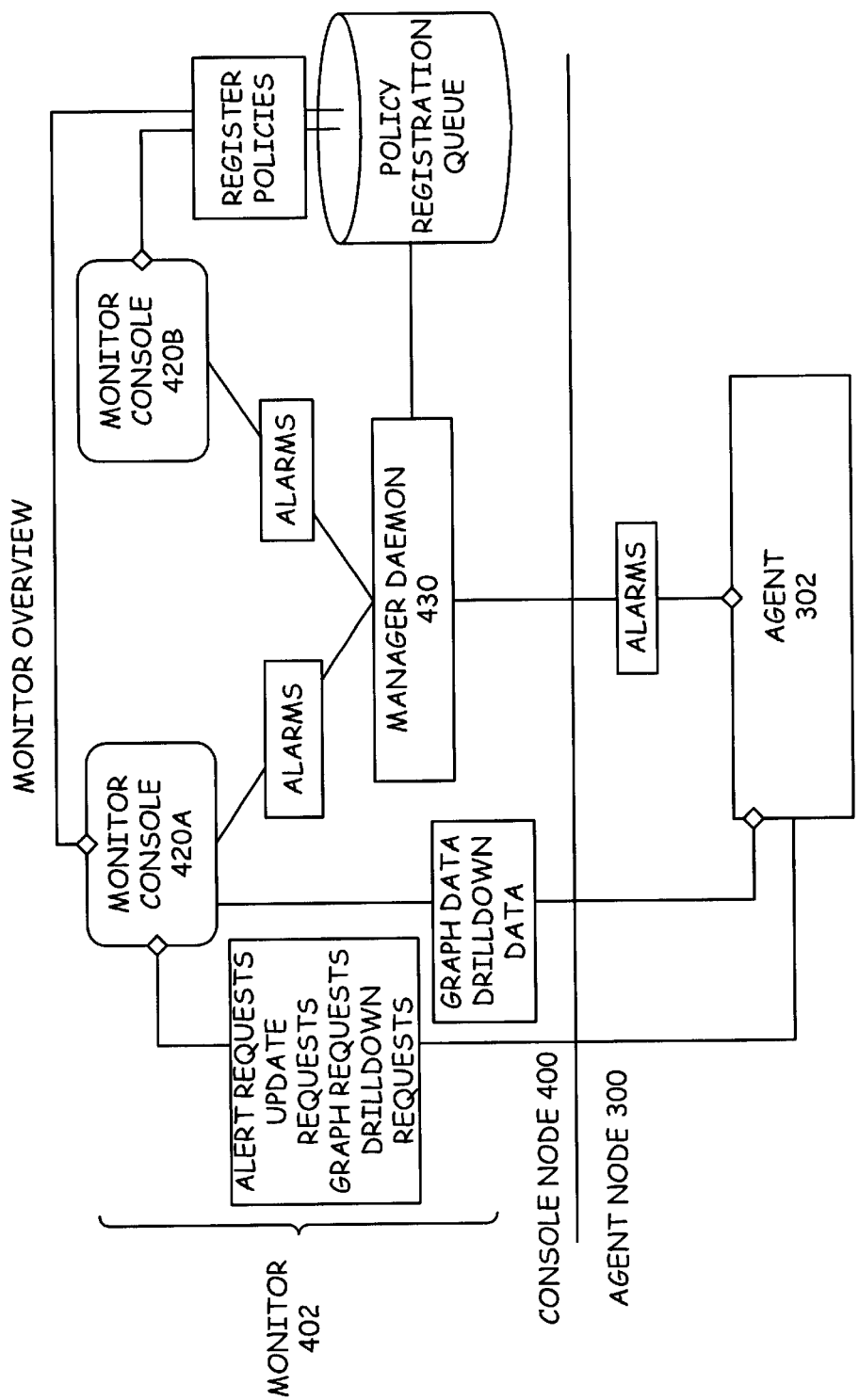
FIG. 4 is a block diagram illustrating an overview of the Monitor component of the enterprise management system according to one embodiment.

FIG. 4 shows an overview of the Monitor component 402 of the console node 400 of the enterprise management system 180. The Monitor 402 comprises a Manager Daemon 430, one or more Monitor Consoles (as illustrated, 420a and 420b), and a Policy Registration Queue 440. Although two Monitor Consoles 420a and 420b are shown in FIG. 4, the present invention contemplates that one or more Monitor Consoles may be executing on any of one or more console nodes 400.

In the preferred embodiment, the Monitor Consoles 420a and 420b use a graphical user interface (GUI) for user input and information display. Preferably, the Monitor Consoles 420a and 420b are capable of sending several different types of requests to an Agent 302, including: alert requests, update requests, graph requests, and drilldown requests. An alert request specifies one or more thresholds to be checked on a routine basis by the Agent 302 to detect a problem on the agent node 300. For example, an alert request might ask the Agent 302 to report to the Monitor Console 420a whenever usage of a particular software process exceeds a particular threshold relative to overall CPU usage on the agent node 300. An update request is a request for the status of the Agent 302. For example, the requested status information might include the version number of the Agent 302 or the presence of any alarms in the Agent 302. A graph request is a request to receive graph data, i.e., data on a metric as routinely collected by the Agent 302, and to receive the data in real time, i.e., whenever it becomes available from the present time onward. By obtaining and displaying graph data, the Monitor Console 420*a* enables the rapid identification and communication of potential application and system performance problems. Preferably, the Monitor Console 420*a* displays graph data in a graphical format. A drilldown request is a request to receive drilldown data, i.e., data on an entire metric group (a set of metrics) as collected by the Agent 302. By obtaining and displaying drilldown data, the Monitor Console 420*a* provides the ability to focus, in real-time, on a specific set of processes, sessions, or users. Preferably, the Monitor Console 420*a* displays drilldown data in a tabular format.

Whenever the Agent 302 generates an alarm to indicate a troublesome status on the agent node 300, the Manager Daemon 430 intercepts the alarm and feeds the alarm to one or more Monitor Consoles, such as 420*a* and 420*b*. Typically, an alarm is a notification that a particular threshold has been exceeded on a monitored process or subsystem on an agent node 300. The Manager Daemon 430 is capable of receiving alarms from a plurality of Agents 302. A Manager Daemon 430 is preferably always running on each console node 400 so that alarms can be captured even when the Monitor Consoles 420*a* and 420*b* are offline.

Each of the Monitor Consoles 420*a* and 420*b* is operable to issue one or more policies. A policy defines a disparate set of metrics to be collected on one or more agent nodes 300. In other words, a policy allows a Monitor Console 420*a* or 420*b* to monitor one or more metrics on one or more agent nodes 300 simultaneously. For example, a user could build and deploy a policy that restricts web browser access on a plurality of agent nodes 300 with the following set of interrelated conditions: "IF more than 80% of server CPU is required by critical production applications, AND the run queue length is greater than six, AND active time on production disks exceeds 40%." Policies are registered with the Policy Registration Queue 440, from which they are disseminated to the appropriate Agents 302. An Agent 302 can execute a plurality of policies simultaneously.

Figure 5:
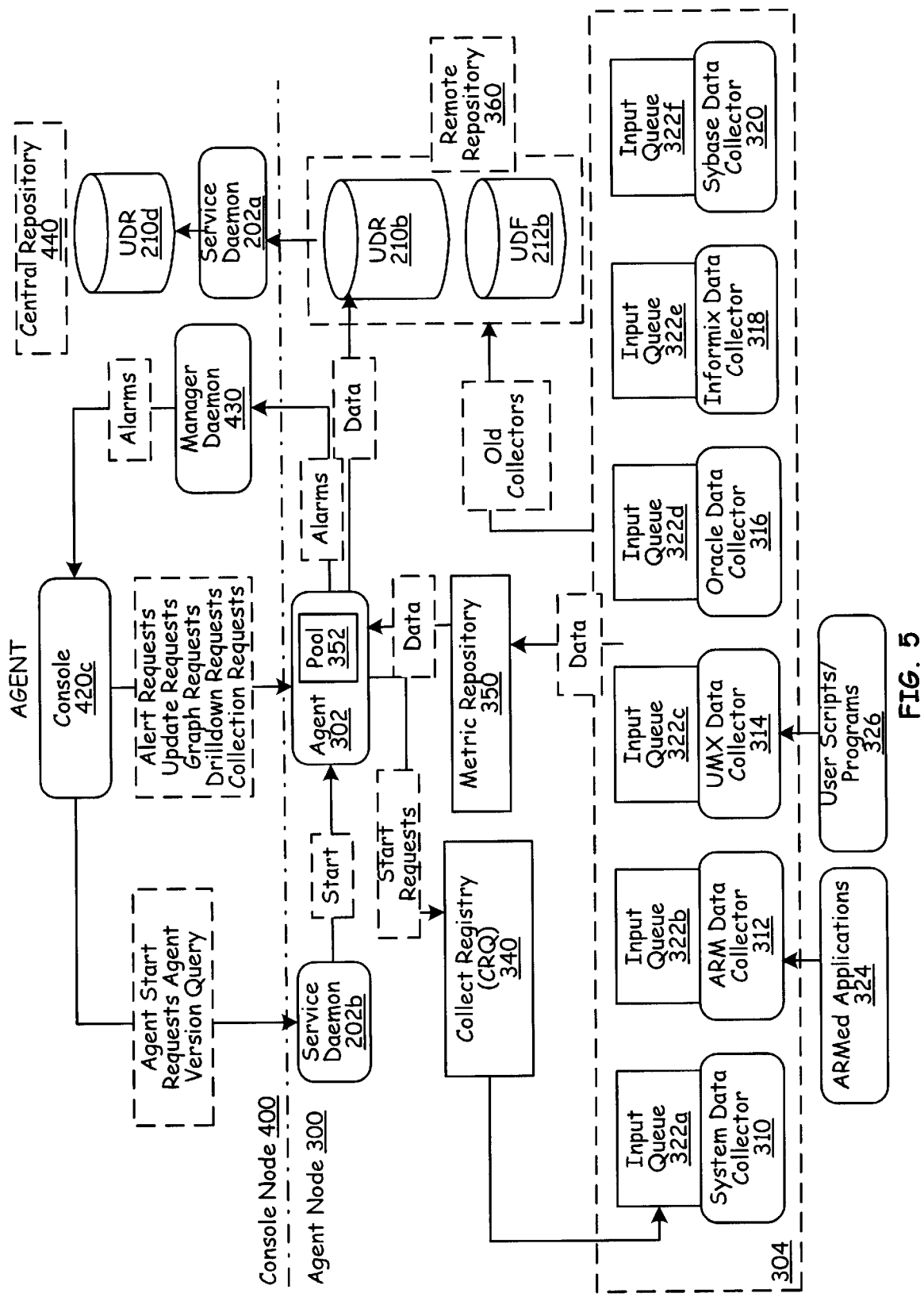
FIG. 5 is a block diagram illustrating an overview of the Agent component of the enterprise management system according to one embodiment.

FIG. 5 shows an overview of the Agent component 302 of the agent node 300 of the enterprise management system 180. In the preferred embodiment, every agent node 300 has one Agent 302. The Monitor Console 420*c* is another instance of the Monitor Consoles illustrated in FIG. 4 with reference numbers 420*a* and 420*b*.

When the user desires to start an Agent 302 and begin collecting data on a particular agent node 300, the user operates the Monitor Console 420*c* to issue an agent start request through a Service Daemon 202*b*. Preferably, the Service Daemon 202*b* is always executing on the agent node 300 in order to intercept messages from one or more Monitor Consoles 420*c* even when the Agent 302 is offline. In the preferred embodiment, the Service Daemon 202*b* is largely invisible to the user. The Service Daemon 202*b* also intercepts agent version queries from the Monitor Console 420*c*. An agent version query is a request for the current version number of the piece of software that comprises the Agent 302. As described above, the Monitor Console 420*c* is able to send alert requests, update requests, graph requests, and drilldown requests to the Agent 302. The Monitor Console 420*c* may also send collection requests, which are requests for the Agent 302 to begin collecting particular metrics or metric groups on the agent node 300.

When the Agent 302 receives a collect request from the Monitor Console 420*c* through the Service Daemon 202*b*, the Agent 302 initiates the collection through the Collect Registry Queue (CRQ) 340. The Agent 302 uses the Collect Registry Queue 340 to control and schedule data collection. By helping the Agent 302 know how many collectors 304 are running and whether the collectors 304 are each the right type, the Collect Registry Queue 340 prevents redundant collection. Each data collector 310, 312, 314, 316, 318, and 320 is designed to gather one or more metrics concerning the operating system and/or one or more subsystems. The present invention contemplates a variety of data collectors 304, but for illustrative purposes, the following are shown: system data collector 310 (which collects data from the operating system), ARM data collector 312 (which collects data from ARM-instrumented applications 324), UMX data collector 314 (which collects data from user scripts/ programs 326), Oracle data collector 316 (which collects data from an "ORACLE" database management system), Informix data collector 318 (which collects data from an "INFORMIX" database management system), and Sybase data collector 320 (which collects data from a "SYBASE" database management system). Each of the collectors 310, 312, 314, 316, 318, and 320 has an associated input queue 322*a*, 322*b*, 322*c*, 322*d*, 322*e*, and 322*f*, respectively. The input queues 322*a*, 322*b*, 322*c*, 322*d*, 322*e*, and 322*f* store the requested metric groups and associated collection intervals for each collector 304. Although a collector 304 typically supports multiple metric groups, the collector 304 only collects those metric groups that are requested. After metric data is collected, the data is transferred to a Metric Repository 350. The Metric Repository 350 sits between the Agent 302 and the collectors 304 and provides fast interprocess communication between the Agent process 302 and the collector processes 304.

Metric data from the Metric Repository 350 is efficiently copied into the Metric Repository Pool 352, where the data is cached by metric group, instance, and collection rate. The Metric Repository Pool 352 is located in the memory space of the Agent 302 and is invisible to everything other than the Agent 302. By storing collected data for the metric groups in a single Metric Repository Pool 352 for each Agent 302 and agent node 300, the enterprise management system 180 prevents redundant collection: whether one Monitor Console 420*c* or a plurality of Monitor Consoles such as 420*a* through 420*c* request data collection for a particular metric group, the data is only collected once.

In the preferred embodiment, the Collect Registry Queue 340, Metric Repository 350, Metric Repository Pool 352, input queues 322*a*, 322*b*, 322*c*, 322*d*, 322*e*, and 322*f*, and Universal Data Repository (UDR) history files 210*a*, 210*b*, 210*c*, and 210*d* comprise a data structure called a base queue or BASEQ. A BASEQ is a contiguous relocatable heap of memory: in other words, the BASEQ provides random allocation of data in a contiguous block of storage. The BASEQ provides fast interprocess communication with locking synchronization between the consumer of data and the provider of data. The BASEQ can be stored in different types of memory, such as volatile memory like RAM or nonvolatile memory like a hard disk. In the preferred embodiment, the BASEQ is implemented as a base class in an object-oriented programming environment. In this embodiment, specialized variants of the BASEQ are implemented as derived classes which inherit the properties of the base class. For example, UDR 210*a*, 210*b*, 210*c*, and 210*d* are implemented with a derived class which is located on a file on disk, while Metric Repository 350 is implemented with a derived class which is located in a shared memory segment.

In the preferred embodiment, the enterprise management system 180 provides for the storage of historical metric data as well as the monitoring of real-time metric data. Therefore, in addition to passing the metric data to the Monitor Console 420c, the Agent may also send the metric data to a Remote Repository 360 for storage. The Remote Repository 360 is located on the agent node 300, and each agent node 300 may have its own Remote Repository 360. The Remote Repository comprises a database in the Universal Data Repository (UDR) format 210b and/or a database in the Universal Data Format (UDF) format 212b. The UDF 212b is an alternative data format to the UDR 210b and is used primarily by older versions of the collectors 304. The UDR format 210b is multi-node: it can store data from multiple sources in one place. UDR 210b is also multi-rate: it can store data at a plurality of levels of varying granularity by sending data at each successive level through an intelligent summarization process according to the present invention. Historical data can also be stored in a Central Repository 440 on the console node 400. A Service Daemon 202a controls the data transfer from the Remote Repository 360 to the Central Repository 440. In the preferred embodiment, the Central Repository 440 comprises a UDR 210d.

Figure 6:
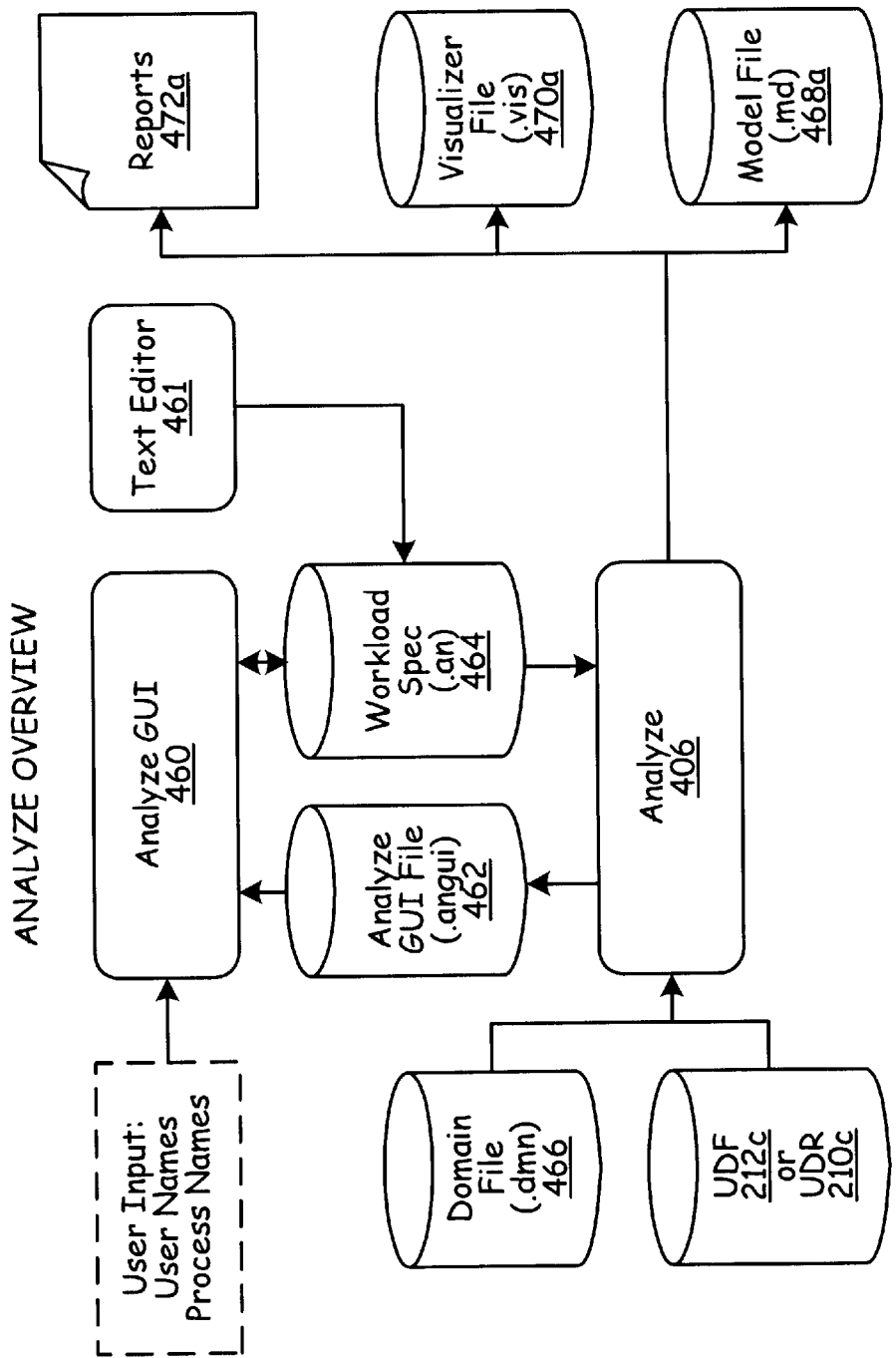
FIG. 6 is a block diagram illustrating an overview of the Analyze component of the enterprise management system according to one embodiment.

FIG. 6 illustrates an overview of the Analyze component 406 of the console node 400 of the enterprise management system 180. In the preferred embodiment, Analyze 406 comprises the "ANALYZE" portion of the "BEST/1 FOR DISTRIBUTED SYSTEMS" software package available from BMC Software, Inc. Essentially, Analyze 406 takes the data collected by one or more Agents 302 and creates a model of one or more computer systems and the processes that run on those computer systems. In the preferred embodiment, Analyze 106 can generate model representations of multi-vendor environments, system memory, multiple processors, disk drives, logical volumes, RAID devices, load balancing, ASCII and X terminals, local and remote file servers, independent and dependent transactions, client/server workloads, private and shared memory/ transaction, CPU priority scheduling, networks of different types, and "ORACLE", "SYBASE", and "INFORMIX" database environments. In the preferred embodiment, Analyze 406 takes as input a domain file 466 which identifies the agent nodes 300 on the network and the relationship between them. Analyze 406 also takes as input a data repository in either UDF 212c or UDR 210c format, wherein the data repository 212c or 210c is a set of metric groups collected from one or more agent nodes 300.

The Analyze user then can either use a default workload specification (.an) 464 or create his or her own, either with the supplied graphical user interface (GUI) 460 or with a standard text editor 461. A workload specification 464 includes a user name, process names, and other information. A workload is a useful grouping of key performance metrics. For example, the user might classify a plurality of Oracle-related processes as an "Oracle" workload, a plurality of other processes as a "payroll" workload, and the remainder as a "miscellaneous" workload. From this classification data, the Analyze engine 406 creates an Analyze GUI file 462 which contains a list of processes captured within the analysis interval. The Analyze GUI file 462 is then passed to the Analyze GUI 460.

Using the Analyze GUI file 462, the domain file 466, and the UDF 212c or UDR 210c data repository, Analyze 406 can create several forms of output. First, Analyze 406 can create a model file 468a. The model file 468a is a model of the workloads, their resource consumptions, and configuration information relating to one or more systems in the enterprise 100. The workload data and other information in the model file 468a is derived from the raw data contained in UDF 212c or UDR 210c and/or classified by the user through the Analyze 406 data analysis functions, Analyze GUI 460, and/or standard text editor 461. Second, Analyze 406 can create reports 472a, which comprise the results of user-specified queries concerning workload characteristics. For example, one instance of reports 472a could be a list of the top ten workloads sorted by total CPU usage. Third, Analyze 406 can create a Visualizer file 470a, wherein the Visualizer file 470a is a description of the characteristics of the enterprise 100 as determined by the collected metrics and the user input. The Visualizer file 470a can be read and utilized by the Visualizer tool 410. In the preferred embodiment, Visualizer 410 is the "BEST/1-VISUALIZER" available from BMC Software, Inc. With Visualizer 410, performance statistics and workloads can be graphed, compared, drilled down, and visually analyzed to pinpoint hot spots or trends to assist in resource management, system tuning, and configuration changes. Visualizer 410 preferably includes functionality known as MASF (Multivariate Adaptive Statistical Filtering). Using standard deviation techniques, MASF continually interprets performance data and calculates normalcy. MASF graphs are thus used to discover true performance anomalies that deviate from normal performance behavior. In addition to creating Visualizer file 470a and reports 472a, Analyze 406 also generates Model files 468a for performance prediction of the system within an enterprise computing environment 100.

Figure 7:
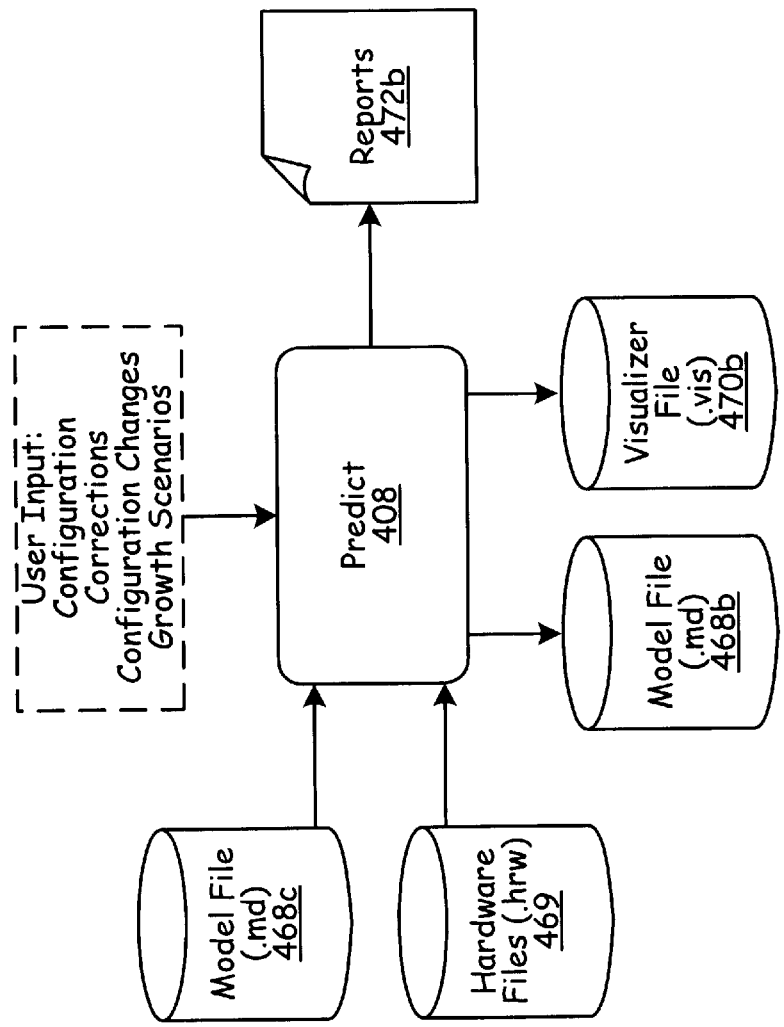
FIG. 7 is a block diagram illustrating an overview of the Predict component of the enterprise management system according to one embodiment.

FIG. 7 shows an overview of the Predict component 408 of the console node 400 of the enterprise management system 180. In the preferred embodiment, Predict 408 comprises the "BEST/1-PREDICT" component of the "BEST/1 FOR DISTRIBUTED SYSTEMS" software package available from BMC Software, Inc. Predict 408 is a planning tool which forecasts the impact of hypothetical changes on elements of the enterprise 100 such as disparate hardware, software, applications, and databases. Predict 408 takes the workload data from a Model File 468c, such as the Model File 468a generated by Analyze 406, and computes performance statistics such as workload response times, utilization, and throughputs at CPUs, disks, networks, and other elements of the enterprise computing environment 100. Thus, Predict 408 constructs a baseline model from collected data that represents the essence of the system under management. The user can also operate Predict 408 to construct the baseline model from pre-built model components, or from a combination of collected data and pre-built components. Preferably, Predict 408 uses a graphical user interface (GUI) for user input and information display.

After the baseline model has been constructed, the user can modify the baseline model by specifying configuration corrections, configuration changes, and/or growth scenarios. With Predict 408, the user can change one or more attributes of any model, creating "what if?" or hypothetical scenarios. By using methods, modeling techniques, and statistical formulas taken from queuing theory, Predict 408 accurately determines the impact of these workload and configuration changes on performance, such as response time. As one of the results of "what if?" computation, the changes to the baseline are displayed as unitless, numerical response time values relative to the baseline value of one. In the preferred embodiment, response times are broken down into four key components: CPU service time and wait time, I/O service time and wait time, network service time and wait time, and wait time for transactions running on external systems. Using the four key components, Predict 408 also preferably calculates other critical performance metrics such as throughput, CPU queue lengths, disk queue lengths, paging rates, and the amount of memory required to eliminate excessive paging.

Predict 408 preferably includes a multivendor hardware table 469, wherein the table includes the hardware specifications that Predict 408 uses to calculate the performance of hypothetical changes to the enterprise 100. Therefore, changes to CPU, memory, I/O, priorities, transaction rates, and other attributes can be evaluated across a plurality of heterogeneous computer systems 150. Furthermore, in modeling the configuration and workload changes across multiple systems, Predict 408 automatically calculates interaction and interference between systems. Predict 408 also preferably provides scenario planning, or modeling incremental growth over time, in order to determine the life expectancy of computing resources and the point at which resources should be upgraded to ensure that performance remains at an acceptable level. In the various ways set forth above, Predict 408 thus permits a user to plan for the future by "test driving" both actual and alternative or hypothetical configurations of the enterprise 100.

Like Analyze 406, Predict 408 can generate reports 472b, a Visualizer file 470b, and a model file 468b. The model file 468b can be modified and passed back to Predict 408 for additional modeling.

Power-Tail Distributions

Figure 8:
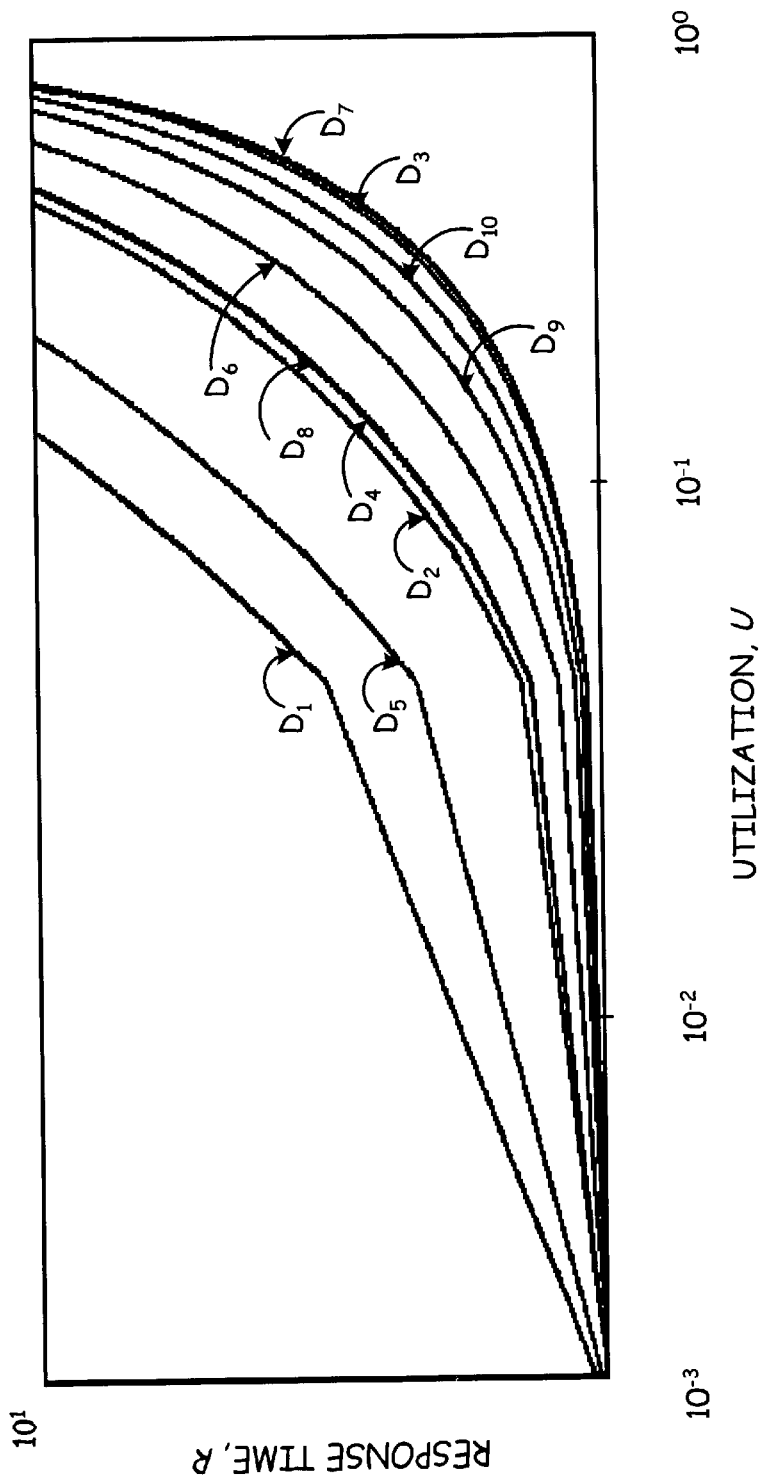
FIG. 8 is a graph illustrating the modeling of WWW server performance using an M/G/1 queue.

Power-tailed behavior, also known as heavy-tailed behavior, exhibits very "bursty" or "chaotic" behavior. The properties of a power-tail distribution are discussed below. FIG. 8 illustrates the importance of considering power-tail phenomena in the analysis and prediction of computer system performance. FIG. 8 shows a performance model of a World Wide Web (WWW) server using an M/G/1 queue using synthetic data sets $D_1$ through $D_{10}$ from Table 8 (see "Detection of Power-Tail Behavior using the $PT_{(\alpha=1.4)}$ Distribution" below). Because it has been empirically demonstrated that WWW server file size requests are power-tail distributed, thus the time required to process the data is power-tail distributed as well. Consequently, the M/G/1 queue can be used for reasonable performance approximations. The erratic behavior concerning the performance of the model shown in FIG. 8 indicates the importance of appropriately characterizing the workload, especially when power-tail behavior has been observed. Proper workload characterization is necessary for generating meaningful performance projections. When the underlying data is power-tail distributed, the impact on performance prediction is more significant.

Figure 9:
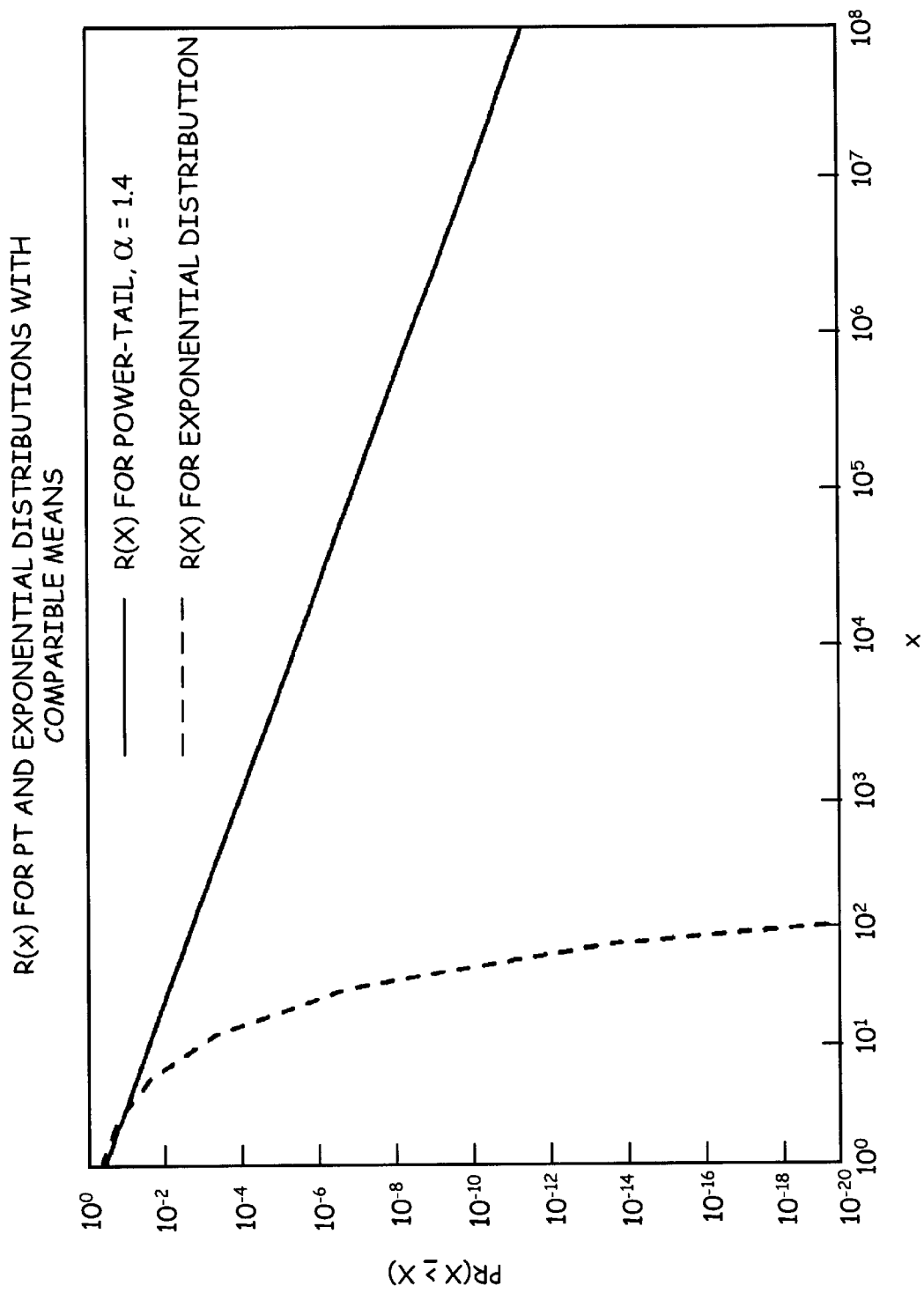
FIG. 9 is a graph illustrating a comparison of reliability functions for power-tail and exponential distributions.

Distributions that are not power-tailed have a reliability function $R(x)=P(X \geq x)$ which eventually decays exponentially. In other words, the likelihood of obtaining large values for $R(x)$ diminishes rapidly. On the other hand, the reliability function for power-tail distributions decays via a power of x at a rate that is much slower than exponential-type distributions. That is, as shown by equation 601:

$$R(x) \Rightarrow \frac{c}{x^\alpha} \text{ for large } x, \tag{601}$$

wherein c and $\alpha$ are constants>0. These behaviors are illustrated in FIG. 9. FIG. 9 shows a comparison of $R(x)$ for a power-tail distribution with $\alpha=1.4$ and an exponential distribution, wherein both distributions have comparable means. Differentiation of equation 601 yields the p.d.f. (probability density function), as shown by equation 602:

$$f(x) \Rightarrow \frac{\alpha c}{x^{\alpha+1}}. \tag{602}$$

The $l^{th}$ moment of a distribution, also known as the expectation of $X^l$, is $E(X^l)$. As shown by equation 603, $E(X^l)$ is defined as follows:

$$E(X^l) = \int_0^\infty x^l f(x)\,dx. \tag{603}$$

From equations 602 and 603, it follows that all moments for $l \geq \alpha$ are unbounded. Thus, if $\alpha \leq 2$ then f(x) has unbounded variance. If $\alpha \leq 1$, then f(x) has an unbounded mean. The present description is concerned with power-tail distributions that have a finite mean and unbounded variance. In other words, the a parameter will be such that $1<\alpha<2$. Although distributions for which $\alpha=2$ do exhibit unbounded variance, they will not be considered power-tail distributions. See G. Samorodnitsky and M. Taqqu, Stable Non-Gaussian Processes: Stochastic Models with Infinite Variance, Chapman and Hall, New York, London, 1994; W. Klinger, "On the Convergence of Sums of Power-Tail Samples to their $\alpha$-Stable Distributions," Masters Thesis, University of Connecticut, 1997.

Let $\{X_i | 1 \leq i \leq N\}$ be a set of independent and identically distributed (i.i.d.) random variables with distribution $F(\cdot)$ and mean E(D). Furthermore, let $\{X_{(1)} \leq X_{(2)}, \ldots, \leq X_{(N)}\}$ be the same set, but ordered in size (i.e., value) place by order statistics. Then, as shown by equation 604:

$$F_{(N)}=[F(X)]^N. \tag{604}$$

In other words, if N samples are taken from some distribution $F(\cdot)$, then the distribution of the largest of them is given by $[F(x)]^N$. See W. Feller, An Introduction to Probability Theory and its Applications, Vol. I & II, John Wiley and Sons, New York, 1971. For power-tail distributions, it is known that the expected value of this largest member behaves as follows, as shown by equation 605:

$$E_{(N)} \rightarrow E(X)N^{1/\alpha}. \tag{605}$$

On the contrary, it is known that for a random sample of size N, the expected largest order statistic from the exponential distribution can be approximated by equation 606:

$$E_{(N)} = E(X)\sum_{j=1}^{N} \frac{1}{j} \rightarrow E(X)\log(N). \tag{606}$$

Figure 10:
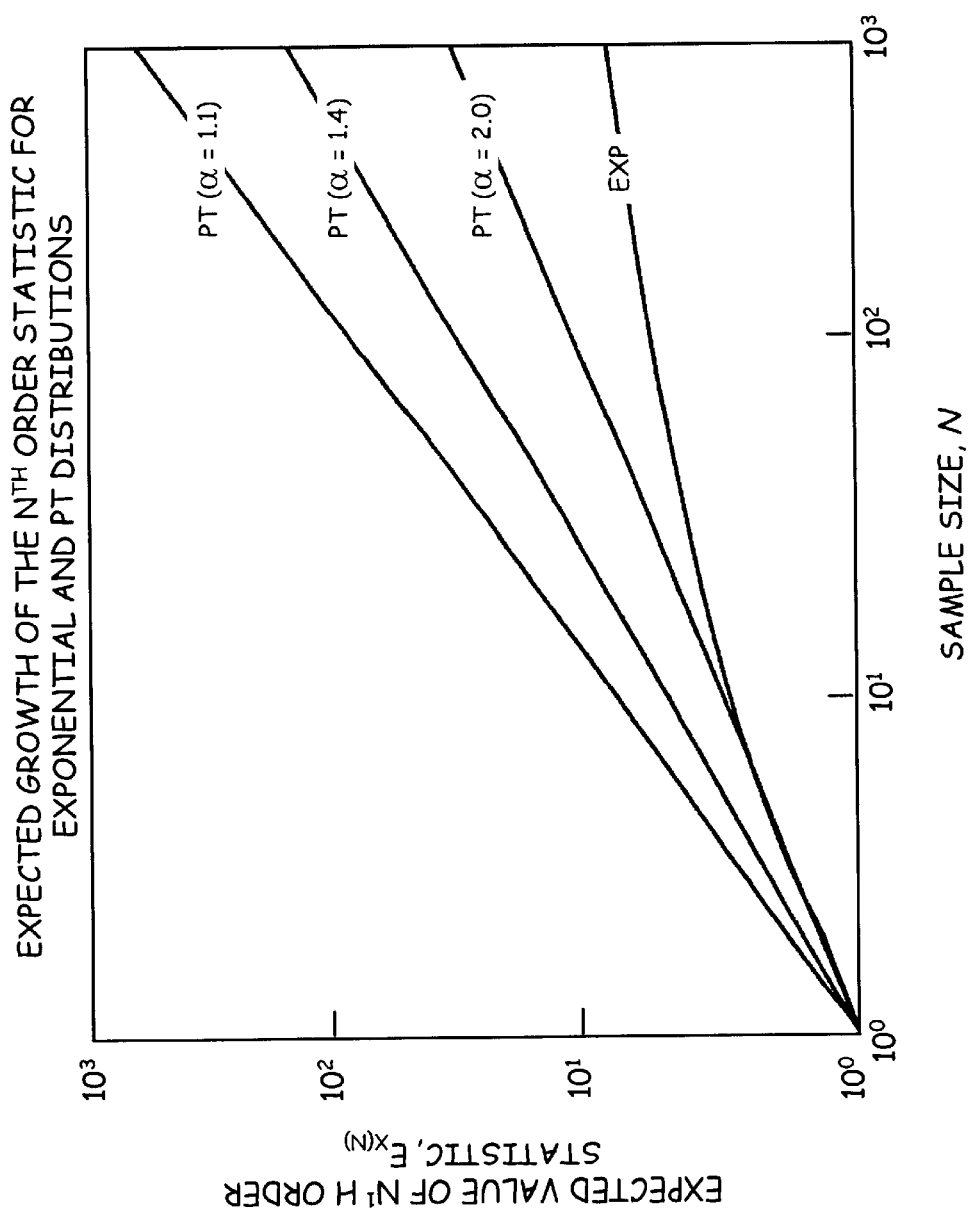
FIG. 10 is a graph illustrating a comparison of the approximate behavior of the largest order statistic for comparable power-tail and exponential distributions.

FIG. 10 illustrates that for power-tail distributions, as N gets larger, the largest order statistic from a random sample of a power-tail distribution grows rapidly. FIG. 10 further illustrates that the largest order statistic for an exponential distribution grows much more slowly than that of a power-tail distribution.

$E_{(N)}$ asymptotically describes the expected behavior of the Nth largest order statistic when the number of data points is sufficiently large. The use of equations 605 and/or 606 for data analyses depends on the circumstances of a particular situation, such as the amount of historical data, the number of samples, and other data that are available.

Analytic Method for Power-Tail Detection

A power-tail distribution typically has three distinctive properties: large deviations from the mean, high variance, and scaling properties which are embodied in large values in the tail of the distribution. The system and method of one embodiment of the present invention test for the presence or absence of all three distinctive properties for an independent and identically distributed random variable.

Figure 11:
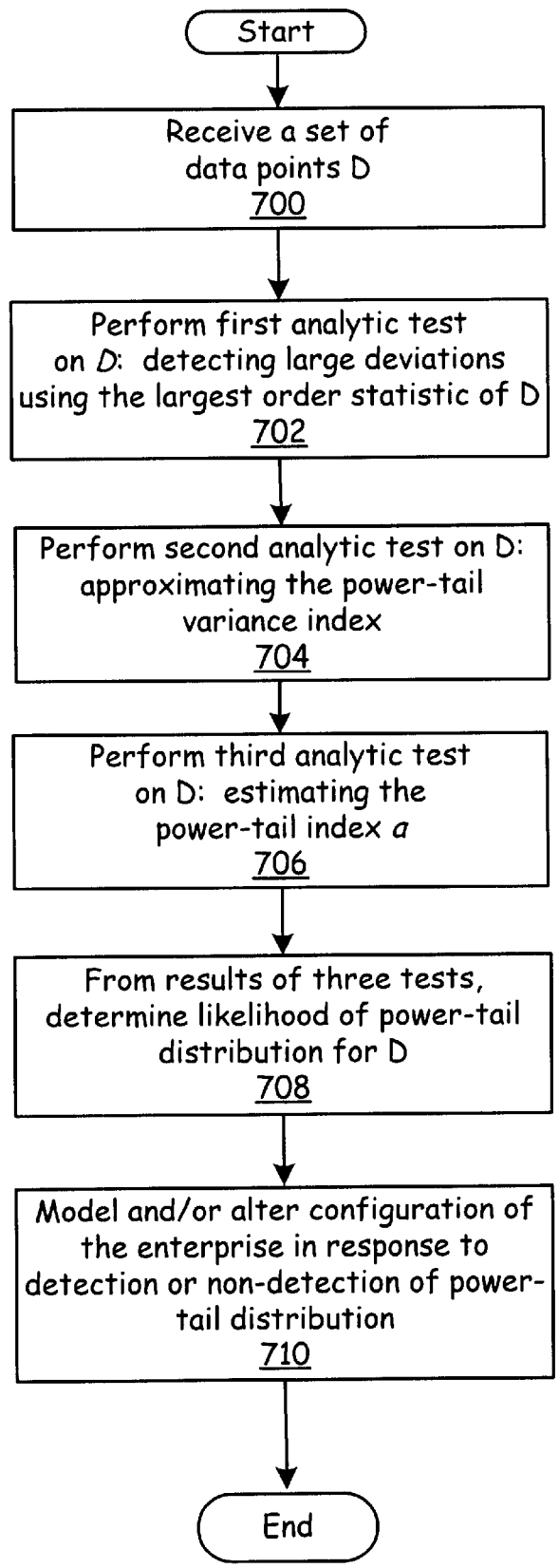
FIG. 11 is a flowchart illustrating an overview of the three power-tail tests in one embodiment.

FIG. 11 is a flowchart illustrating an overview of the power-tail detection method. In step 700 a set of data points or data set D is received from one or more computer systems in the enterprise. The data set D represents a series of measurements of one or more system resources of the one or more computer systems. Furthermore, this test is applied only to detect a renewal power-tail behavior, and to that end, the data points are preferably not correlated with one another; in other words, the data points are independent and identically distributed.

To detect whether a renewal power-tail behavior is unlikely, possible, or likely, three analytic tests or algorithms are performed on the data set D, in steps 702, 704, and 706. In alternate embodiments, the three tests could be performed in any order. In alternate embodiments, only one or two of the three tests could be performed; however, the results would not be as accurate, and so it is recommended that all three tests be performed. The results of the three tests, in combination, determine the likelihood of a power-tail distribution for the data set D.

In step 702 the first analytic test is performed. The first test is an algorithm for detecting large deviations using the largest order statistic of D. The two possible outcomes are "successful" and "unsuccessful." The first test is discussed in detail below.

In step 704 the second analytic test is performed. The second test is an algorithm for approximating the power-tail variance index. The two possible outcomes are "successful" and "unsuccessful." The second test is discussed in detail below.

In step 706 the third analytic test is performed. The third test is an algorithm for estimating the power-tail index α. The two possible outcomes are "successful" and "unsuccessful." The third test is discussed in detail below.

In step 708 the outcomes of the three tests are compared to determine the likelihood of a power-tail distribution for the data set D. If all three tests were successful, then it is likely that D is power-tail distributed. If all three tests failed, then it is unlikely that D is power-tail distributed. If the results were a mix of success and failure, then the results are ambiguous; more data or analysis is needed. The eight possible outcomes of the three tests are discussed in more detail below.

In step 710 the enterprise is modeled and/or its configuration is altered in response to the detection or non-detection of a power-tail distribution. Modeling according to one embodiment is discussed in detail with reference to FIGS. 6 and 7. In various embodiments, this modeling may further comprise one of more of the following: displaying the determination from step 708 to a user, predicting future performance, graphing a performance prediction, generating reports, asking a user for further data, and permitting a user to modify a model of the enterprise. In one embodiment, Analyze 406 and/or Predict 408, as discussed in detail with reference to FIGS. 6 and 7, implement the modeling, analysis, and/or prediction in response to the determination regarding the likelihood of a power-tail distribution. In one embodiment, in step 710 a configuration of the enterprise is altered in response to the determination from step 708. Altering a configuration of the enterprise may comprise, for example, reconfiguring a network topology or installing or upgrading additional resources, such as CPUs, software, memory resources, or network routers or hubs.

First Analytic Test

Power-tail distributions tend to exhibit large deviations from the mean. The first analytic test is an algorithm that tests for this property. Consider an i.i.d. random sample $D=\{d_1, d_2, \ldots, d_N\}$, of size N with sample mean E(D), drawn from some unknown distribution. The goal of the first test is to determine whether or not the largest sample of D is experiencing large deviations from its mean E(D) relative to a comparable exponential distribution. Examination of the largest order statistic of D can provide useful information in this regard.

Let $D_{(N)}$ be defined as the largest order statistic of D. Let $E_{(N)}$ be defined by equation 606, where the probabilities $P(X \geq D_{(N)})$ and $P(X \geq E_{(N)})$ are the probabilities of some random variable (r.v.) X exceeding or equaling $D_{(N)}$ and $E_{(N)}$, respectively. Probabilities are computed using the distribution of the largest order statistic for the exponential distribution with mean E(D). The exponential distribution is used as a reference distribution. Both D and the reference exponential distribution have the same mean: E(D).

For exponential distributions, the distribution of the Nth order statistic can be computed by equation 607:

$$F(x)=[1-e^{-\lambda x}]^n. \quad (607)$$

Applying the above, it follows that equation 608 is such that:

$$P_D = P(X \geq D_{(N)}) = 1 - \left[1 - e^{-\frac{D_{(N)}}{E(D)}}\right]^N \quad (608)$$

and equation 609 is such that:

$$P_E = P(X \geq E_{(N)}) = 1 - \left[1 - e^{-\frac{E_{(N)}}{E(D)}}\right]^N, \quad (609)$$

wherein $E_{(N)}$ can be approximated by equation 606, wherein $D_{(N)}$ is the largest order statistic of D, and wherein E(D) is the mean (i.e., the expected value) of the data set D. If $P_E \approx P_D$, then one can reasonably assume that D is not experiencing large deviations. On the other hand, if $P_D << P_E$, then one can infer that D is exhibiting large deviations. The rationale is that the probability of obtaining such a large order statistic is very unlikely, given the assumptions and sample size. The above can be extended by choosing an arbitrarily small tolerance factor t, such that if $P_D \leq t$, then D is experiencing large deviations. If $P_D > t\Delta$, then D is not experiencing large deviations. The interval (t,tα) specifies the range where it is statistically unclear whether or not large deviations are occurring. If $P_D << P_E$ and $P_D < t$, then one can infer that power-tail behavior may be present. Therefore, the probability of obtaining such a large order statistic from some random sample is quite remote, assuming that the underlying distribution is exponential.

Figure 12:
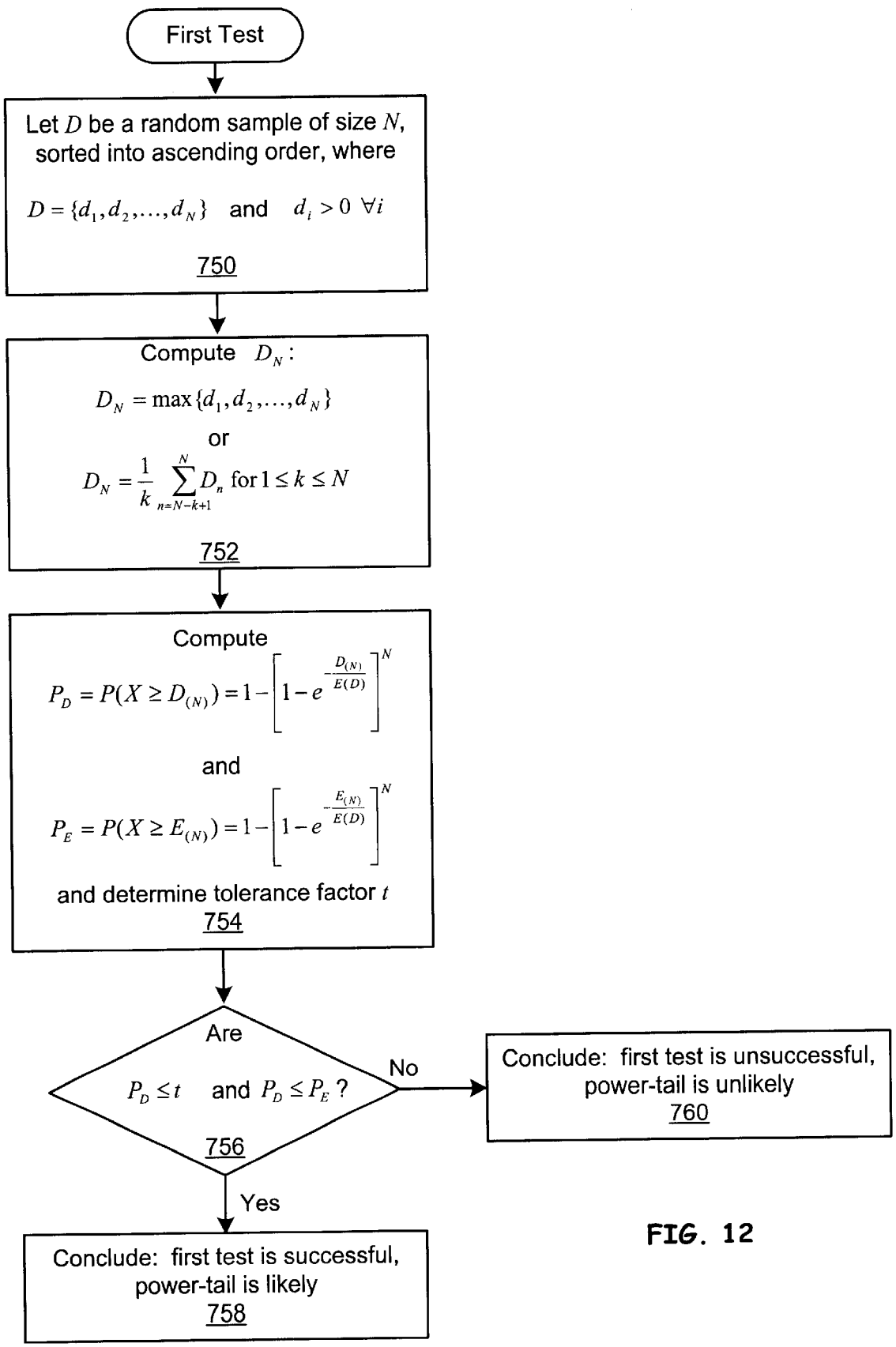
FIG. 12 is a flowchart illustrating the first power-tail test in one embodiment.

The algorithm that performs the first analytic test in one embodiment is illustrated in FIG. 12. In step 750 let a data set D be a random sample of size N sorted into ascending order, where $D \{d_1, d_2, \ldots, d_N\}$ and $d_i > 0$ $\forall i$. In step 752 the value of $D_N$ is computed. This can be done by either equation 610:

$$D_N = \max\{d_1, d_2, \ldots, d_N\} \quad (610)$$

or equation 611:

$$D_N = \frac{1}{k} \sum_{n=N-k+1}^{N} D_n \text{ for } 1 \le k \le N. \quad (611)$$

In other words, in step 752 the largest order statistic or an approximation thereof, i.e., the substantially largest data point of the data set, is determined. In one embodiment, $D_N$ is the set of largest data points out of the data set. Equation 611 is preferred because by averaging the k largest data points (i.e., the set of largest data points), the calculation aids in counteracting the potential effects of (possibly) non-power-tail-distributed outliers. A recommended heuristic for using equation 611 is to choose the five largest order statistics from D (i.e., k=5).

In step 754 $P_D$ is computed using equation 608, $P_E$ is computed using equation 609, and an arbitrarily small tolerance factor t is determined. When computing $P_D$ and $P_E$, let $D_N$ as computed in step 752 approximate $D_{(N)}$. A recommended value for t is $10^{-7}$.

In step 756 it is determined whether $P_D \le t$ and whether $P_D \le P_E$. If so, then the test was successful; in step 758 it is concluded that $X > D_{(N)}$ is unlikely to occur if D is assumed to be exponentially distributed, and therefore D may be exhibiting deviations consistent with power-tail distributions. If the test was not successful, then it is concluded in step 760 that D is unlikely to be power-tail distributed.

Second Analytic Test

The variance of D can be used to determine whether some random sample is exhibiting high variance associated with power-tail distributions. For some random sample $D=\{d_1, d_2, \ldots, d_N\}$ of size N with sample mean E(D), an unbiased estimator for the variance can be computed by equation 612:

$$V_D = \frac{1}{N-1} \sum_{n=1}^{N} (d_i - E(D))^2. \quad (612)$$

The difficulty with approximating the variance for power-tail distributions is that equation 612 indicates that the variance is divergent for particular values of $\alpha$, namely, when $1 < \alpha < 2$, where a is defined by equation 601. One way to overcome this and estimate the behavior of the variance is to use truncated power-tail distributions (TPT-M's), which exhibit finite variance. Because TPT-M distributions are hyperexponential-M distributions with finite variance, it is useful to assume that the data set D can be modeled via some TPT-M distribution. These techniques are discussed in greater detail below, in the section "LAQT Representations of Truncated Power-Tail Distributions (TPT-M's)."

Figure 13:
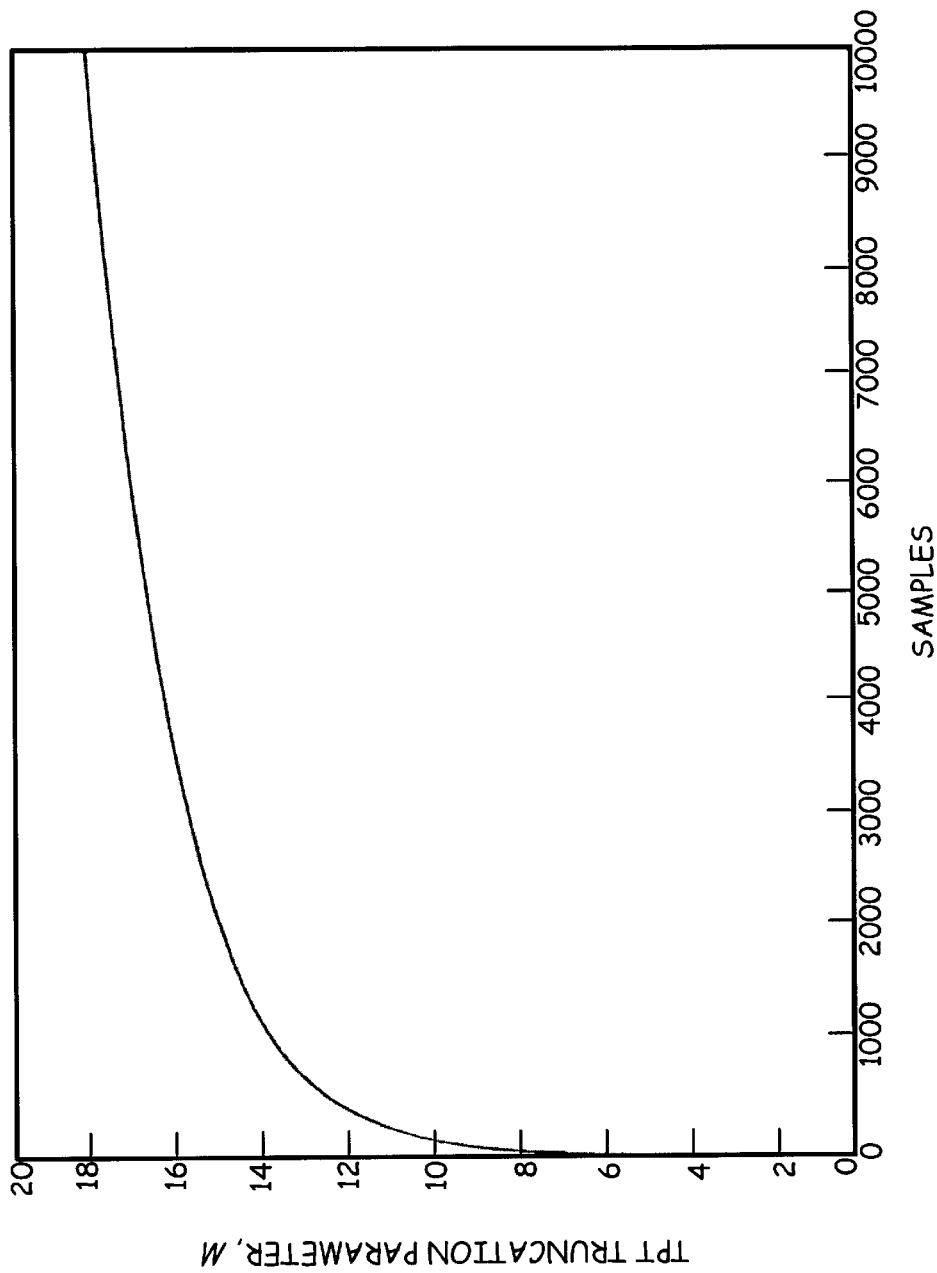
FIG. 13 is a graph illustrating an approximation of the truncation parameter of a truncated power-tail distribution.

For performing the second analytic test, the truncation parameter M should be estimated for a given sample size N. The truncation parameter M is computed according to equation 613:

$$M = \left\lceil -\frac{\log N}{\log(\theta)} \right\rceil, \quad (613)$$

where $\theta=0.5$ is recommended. FIG. 13 illustrates the results of equation 613. For TPT-M distributions, the probability of hitting the $M^{th}$ branch is $p=(1-\theta)\theta^{M-1}$ since the branching probabilities are geometrically distributed. Given N samples or trials, the probability of hitting the $M^{th}$ branch exactly n times can be computed using the binomial distribution given by equation 614:

$$P(X = n) = \binom{N}{n} p^n (1-p)^{N-n}, \quad (614)$$

wherein n=1, 2, ..., N. Note that N is a positive integer and $0 \le p \le 1$. The quantity p denotes the probability of a success or a branch hit. All other branching probabilities can be computed using equation 614. Furthermore, it is well known for equation 614 that E(X)=Np and V(X)=Np(1-p).

When computing the variance using TPT-M's, techniques from Linear Algebraic Queueing Theory (LAQT) can be utilized. These techniques are discussed in greater detail below, in the section "The Linear Algebraic Approach to Queueing Theory."

Once the parameter M has been determined, then the variance can be computed by equation 615:

$$VI_{PT} = 2\Psi[V^2] - \Psi[V]^2. \quad (615)$$

The value yielded by equation 615 will be referred to as the Power-Tail Variance Index ($VI_{PT}$). The purpose of the $VI_{PT}$ is to obtain a rough idea of the behavior of the variance for power-tail distributions. In order to compute this statistic, the $\alpha$ index will be chosen to be 2 since power-tail behavior should be observed when $1 < \alpha < 2$.

Figure 14:
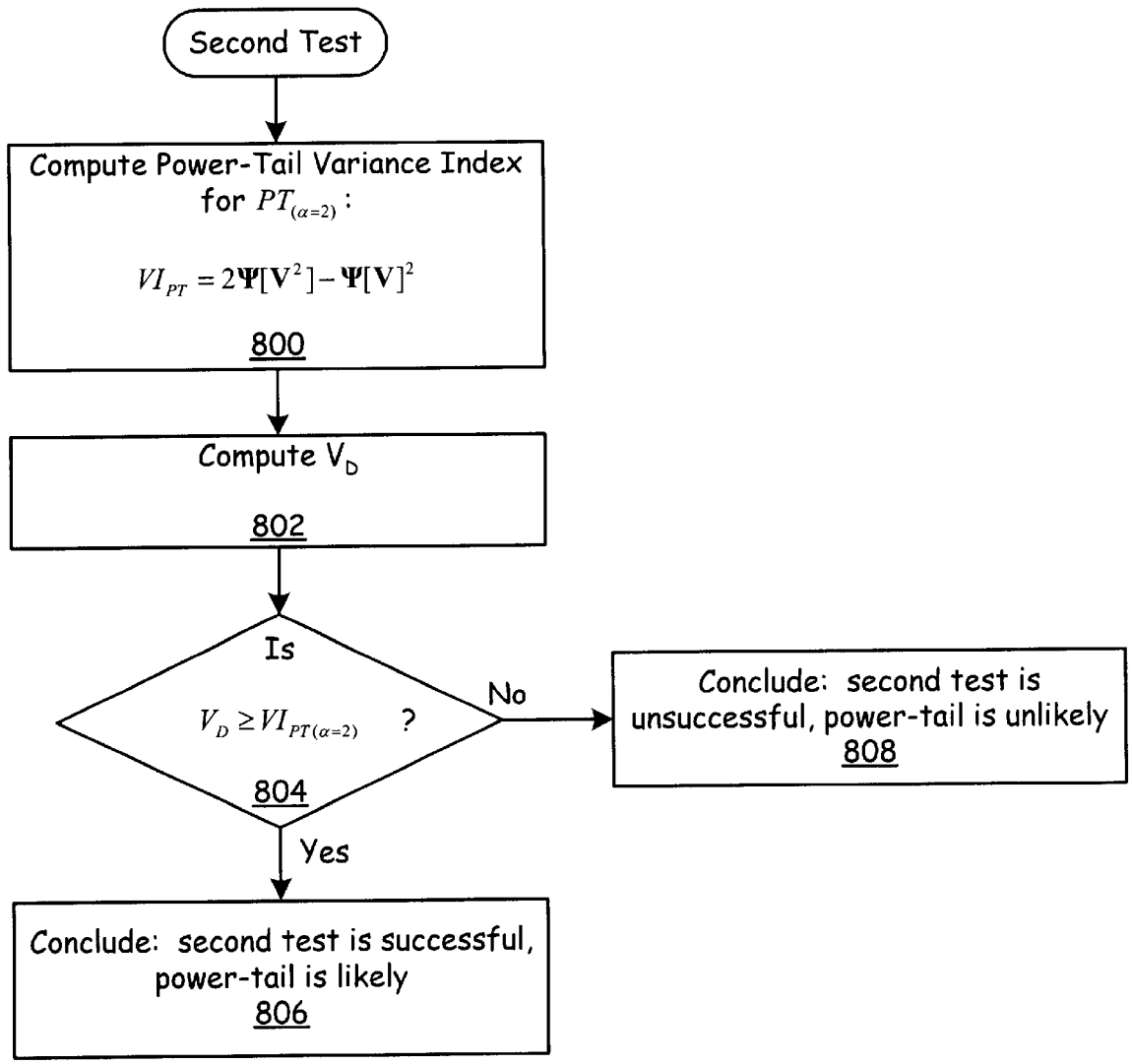
FIG. 14 is a flowchart illustrating the second power-tail test in one embodiment.

The algorithm that performs the second analytic test in one embodiment is illustrated in FIG. 14. In step 800 equation 615 is used to compute the Power-Tail Variance Index ($VI_{PT}$) using $PT_{(\alpha=2)}$. In step 802 $V_D$ is computed using equation 612. In step 804 it is determined whether $V_D \ge VI_{PT(\alpha=2)}$. If so, then the test was successful; in step 806 it is concluded that D is likely exhibiting high variance consistent with that of power-tail distributions, and therefore D is likely to be power-tail distributed. If the test was not successful, then D is not likely highly variable, and it is concluded in step 808 that D is unlikely to be power-tail distributed.

Third Analytic Test

For power-tail distributions, the a index indicates the "variability" or "burstiness" of the distribution. The smaller a is, the more unpredictable the distribution's behavior. As $\alpha$ gets larger, the bursty behavior decreases. The third test involves approximating the $\alpha$ parameter for a data set which is exhibiting properties consistent with large values in the tail portion of the power-tail distribution. For a data set D which may be power-tail distributed, it is important to examine the largest values of D for extremely large deviations from the mean. If $\alpha$ in the reliability function R(x) is less than 2, then for the power-tail distribution, the probability density function associated with the reliability function possesses infinite variance. Probability density functions that exhibit infinite variance are very "bursty" and "chaotic" in behavior and therefore have the characteristics of a power-tail distribution.

Figure 15:
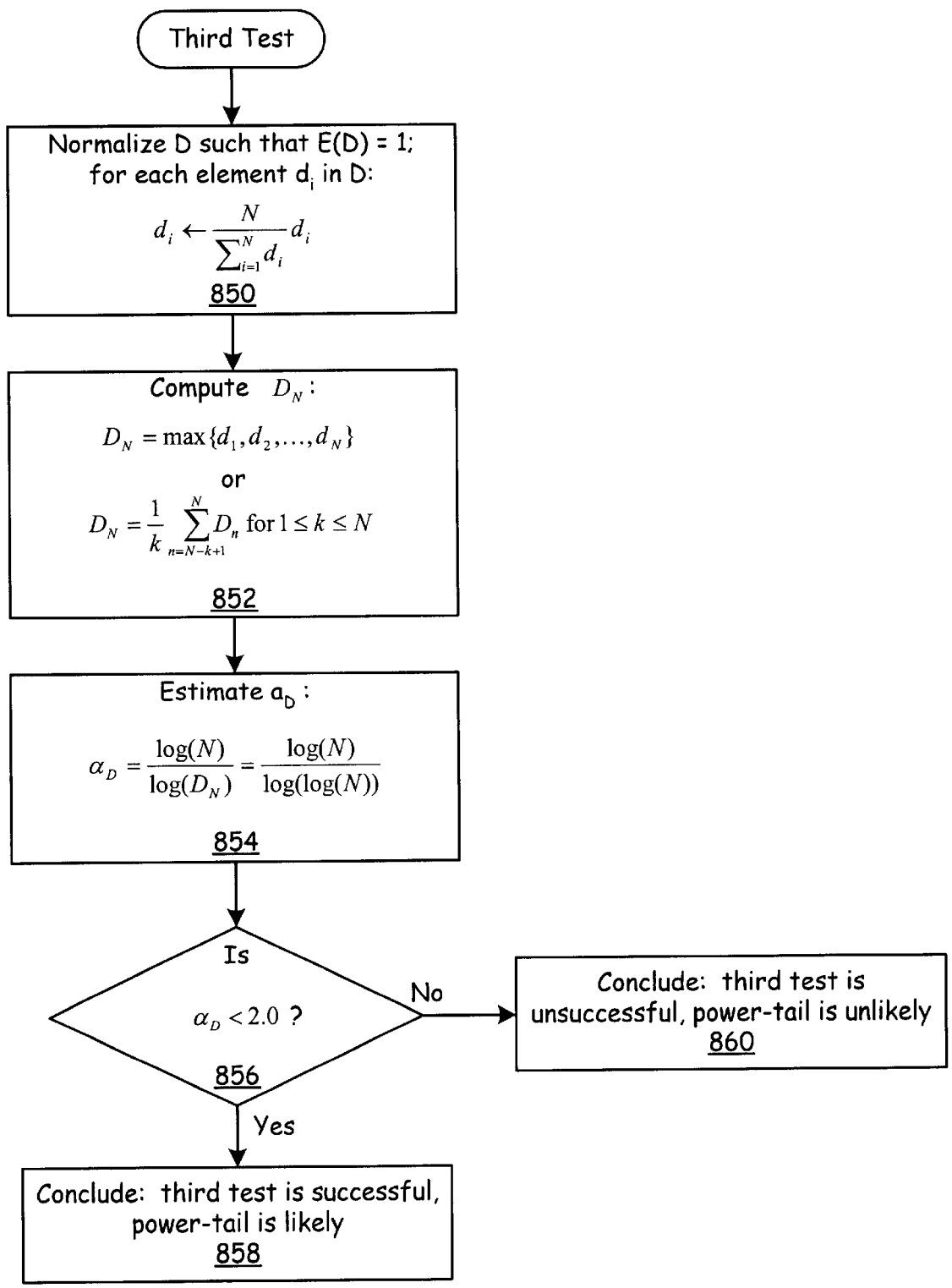
FIG. 15 is a flowchart illustrating the third power-tail test in one embodiment.

The algorithm that performs the third analytic test in one embodiment is illustrated in FIG. 15. In step 850 D is normalized such that E(D)=1. This can be done for each data element in D by the application of equation 616:

$$d_i \leftarrow \frac{N}{\sum_{i=1}^{N} d_i} d_i \quad (616)$$

In step 852 $D_N$ is computed as in the first analytic test, using equation 610 or equation 611.

In step 854 $\alpha_D$ is estimated according to equation 617, wherein equation 617 can be reached by solving for a in equation 605:

$$\alpha_D = \frac{\log(N)}{\log(D_N)} \quad (617)$$

The comparable index $\alpha_E$ for an exponential distribution can be computed by fixing $D_E = \log(N)$ using equation 606. As shown by equation 618, it follows that:

$$\alpha_E = \frac{\log(N)}{\log(D_E)} = \frac{\log(N)}{\log(\log(N))} \quad (618)$$

In step 856 it is determined whether $\alpha_D < 2.0$. If so, then in step 858 it is concluded that the test was successful: D is unlikely to be exponentially distributed, D may be exhibiting high variance consistent with that of power-tail distributions, and therefore D is likely to be power-tail distributed. If it is not true that $\alpha_D < 2.0$, then it is concluded in step 860 that the test was not successful: D is not consistent with power-tail distributions even though D may be exhibiting high variance.

Interpreting the Results of the Three Tests

Each of the three tests has two possible results: successful or unsuccessful. The outcomes of the three analytic tests are combined to determine the likelihood of a power-tail distribution in the data set D. In other words, the combination of the results of the three algorithms determines whether D is exhibiting behavior that is consistent with a power-tail distribution. The eight ($2^3$) possibilities are outlined in the table below. For notational convenience, S denotes a successful outcome, U denotes an unsuccessful outcome, $A_1$ denotes the outcome of the first analytic test, $A_2$ denotes the outcome of the second analytic test, $A_3$ denotes the outcome of the third analytic test, and $I_n$ denotes interpretation n (from 1 to 8) of the results. The table is also shown as FIG. 16.

| $I_n$ | $A_1$ | $A_2$ | $A_3$ | Interpretation: |
|---|---|---|---|---|
| $I_1$ | S | S | S | Suggests D is power-tail distributed |
| $I_2$ | S | S | U | Variance consistent with power-tail; however, may not be power-tailed due to the behavior of distribution's tail |
| $I_3$ | S | U | S | D may be power-tailed due to large deviations and tail behavior; more data is necessary |
| $I_4$ | S | U | U | Variance and tail behavior not consistent with power-tail; $A_1$ may have detected an outlier |
| $I_5$ | U | S | S | $A_3$ detects tail behavior consistent with power-tails; however, more data is necessary |
| $I_6$ | U | S | U | Unclear; more data analysis is necessary |
| $I_7$ | U | U | S | $A_3$ detects tail behavior consistent with power-tails; however, more data is necessary |
| $I_8$ | U | U | U | Suggests D is not power-tail distributed |

If all three tests were successful, then it is likely that D is power-tail distributed. If all three tests failed, then it is unlikely that D is power-tail distributed. If the results were a mix of success and failure, then it is possible that D is power-tail distributed. When the results are ambiguous in this way, more data or analysis is typically needed.

In order to test the three algorithms, several data sets were synthetically generated: an exponential distribution, power-tail distributions with $\alpha = 1.1$ and $\alpha = 1.4$, and a high variance data set with $\alpha = 2.0$. The following tables 1 through 12 summarize the data used in the simulations.

Detection of Power-Tail Behavior Using the Exponential Distribution

TABLE 1

1,000 Samples, Exponential Distribution
$E(D) = 1.0$, $VI = 2.652841$, $P_E = 0.632305$, $\alpha_E = 3.57$, $\log(N) = 6.907755$

| $D_i$ | $V(D)$ | max $\{D_i\}$ | $P_D$ | $\alpha_D$ |
|---|---|---|---|---|
| $D_1$ | 0.95 | 8.10 | 0.930867 | 3.88 |
| $D_2$ | 1.00 | 7.98 | 0.916690 | 3.85 |
| $D_3$ | 0.95 | 7.58 | 0.784008 | 3.69 |
| $D_4$ | 0.96 | 6.53 | 0.947798 | 3.92 |
| $D_5$ | 1.06 | 6.88 | 0.807373 | 3.72 |
| $D_6$ | 0.90 | 6.45 | 0.963827 | 3.46 |
| $D_7$ | 0.98 | 7.22 | 0.959829 | 3.95 |
| $D_8$ | 1.05 | 7.00 | 0.893677 | 3.82 |
| $D_9$ | 1.07 | 8.58 | 0.692601 | 3.62 |
| $D_{10}$ | 1.08 | 7.94 | 0.687276 | 3.61 |

TABLE 2

10,000 Samples, Exponential Distribution
$E(D) = 1.0$, $VI = 2.879695$, $P_E = 0.632305$, $\alpha_E = 4.15$, $\log(N) = 9.210340$

| $D_i$ | $V(D)$ | max $\{D_i\}$ | $P_D$ | $\alpha_D$ |
|---|---|---|---|---|
| $D_1$ | 0.98 | 8.85 | 0.994719 | 4.55 |
| $D_2$ | 0.99 | 9.98 | 0.818404 | 4.26 |
| $D_3$ | 1.03 | 11.55 | 0.724979 | 4.20 |
| $D_4$ | 1.01 | 9.07 | 0.926863 | 4.36 |
| $D_5$ | 0.98 | 8.33 | 0.985454 | 4.49 |
| $D_6$ | 1.00 | 8.75 | 0.974442 | 4.45 |
| $D_7$ | 1.01 | 13.67 | 0.711027 | 4.19 |
| $D_8$ | 1.00 | 8.64 | 0.930648 | 4.37 |
| $D_9$ | 0.97 | 7.90 | 0.996808 | 4.57 |
| $D_{10}$ | 1.00 | 10.31 | 0.566325 | 4.11 |

TABLE 3

100,000 Samples, Exponential Distribution
$E(D) = 1.0$, $VI = 0\ 4.865793$, $P_E = 0.632305$, $\alpha_E = 471$, $\log(N) = 11.512925$

| $D_i$ | $V(D)$ | max $\{D_i\}$ | $P_D$ | $\alpha_D$ |
|---|---|---|---|---|
| $D_1$ | 1.00 | 11.43 | 0.928094 | 4.89 |
| $D_2$ | 1.00 | 11.91 | 0.752966 | 4.77 |
| $D_3$ | 1.00 | 11.36 | 0.871511 | 4.84 |
| $D_4$ | 1.01 | 10.86 | 0.973910 | 4.95 |
| $D_5$ | 1.01 | 9.87 | 0.995997 | 5.04 |
| $D_6$ | 1.00 | 12.21 | 0.927487 | 4.89 |
| $D_7$ | 1.01 | 10.82 | 0.966196 | 4.94 |
| $D_8$ | 1.00 | 11.65 | 0.743881 | 4.76 |
| $D_9$ | 1.00 | 12.74 | 0.710375 | 4.75 |
| $D_{10}$ | 1.01 | 10.28 | 0.995033 | 5.03 |

Detection of Power Tail Behavior Using the $PT_{(\alpha=2.0)}$ Distribution

TABLE 4

1,000 Samples, $PT_{(\alpha=2.0)}$ Distribution
$E(D) = 1.0$, $VI = 2.652841$, $P_E = 0.632305$, $\alpha_E = 3.57$, $\log(N) = 6.907755$

| $D_i$ | $V(D)$ | max $\{D_i\}$ | $P_D$ | $\alpha_D$ |
|---|---|---|---|---|
| $D_1$ | 13.78 | 121.43 | 0.000000 | 1.95 |
| $D_2$ | 1.64 | 12.42 | 0.024939 | 2.93 |
| $D_3$ | 2.85 | 31.65 | 0.000051 | 2.45 |
| $D_4$ | 2.61 | 18.32 | 0.000070 | 2.46 |
| $D_5$ | 6.20 | 68.76 | 0.000000 | 2.18 |
| $D_6$ | 1.78 | 11.32 | 0.030082 | 2.95 |

TABLE 4-continued 1,000 Samples, $PT_{(\alpha = 2.0)}$ Distribution
$E(D) = 1.0$, $VI = 2.652841$, $P_E = 0.632305$, $\alpha_E = 3.57$, $\log(N) = 6.907755$

| $D_i$ | $V(D)$ | max $\{D_i\}$ | $P_D$ | $\alpha_D$ |
|---|---|---|---|---|
| $D_7$ | 1.68 | 10.57 | 0.072006 | 3.07 |
| $D_8$ | 4.79 | 45.16 | 0.000000 | 2.19 |
| $D_9$ | 3.42 | 37.30 | 0.000012 | 2.38 |
| $D_{10}$ | 2.45 | 31.81 | 0.000618 | 2.60 |

TABLE 5

10,000 Samples, $PT_{(\alpha = 2.0)}$ Distribution
$E(D) = 1.0$, $VI = 2.879695$, $P_E = 0.632305$, $\alpha_E = 4.15$, $\log(N) = 9.210340$

| $D_i$ | $V(D)$ | max $\{D_i\}$ | $P_D$ | $\alpha_D$ |
|---|---|---|---|---|
| $D_1$ | 14.73 | 330.88 | 0.000000 | 1.94 |
| $D_2$ | 3.24 | 71.61 | 0.000000 | 2.42 |
| $D_3$ | 2.37 | 31.54 | 0.000000 | 2.37 |
| $D_4$ | 8.96 | 178.92 | 0.000000 | 2.00 |
| $D_5$ | 2.83 | 44.06 | 0.000000 | 2.83 |
| $D_6$ | 3.89 | 78.61 | 0.000000 | 3.89 |
| $D_7$ | 9.52 | 245.60 | 0.000000 | 2.03 |
| $D_8$ | 2.98 | 47.78 | 0.000000 | 2.98 |
| $D_9$ | 3.83 | 75.99 | 0.000000 | 2.31 |
| $D_{10}$ | 3.44 | 79.48 | 0.000000 | 2.40 |

TABLE 6

100,000 Samples, $PT_{(\alpha = 2.0)}$ Distribution
$E(D) = 1.0$, $VI = 4.865793$, $P_E = 0.632305$, $\alpha_E = 4.71$, $\log(N) = 11.512925$

| $D_i$ | $V(D)$ | max $\{D_i\}$ | $P_D$ | $\alpha_D$ |
|---|---|---|---|---|
| $D_1$ | 4.51 | 258.48 | 0.000000 | 2.30 |
| $D_2$ | 5.39 | 372.03 | 0.000000 | 2.24 |
| $D_3$ | 4.75 | 306.09 | 0.000000 | 2.33 |
| $D_4$ | 4.74 | 229.85 | 0.000000 | 2.24 |
| $D_5$ | 5.37 | 352.93 | 0.000000 | 2.17 |
| $D_6$ | 5.73 | 247.26 | 0.000000 | 2.19 |
| $D_7$ | 4.84 | 260.89 | 0.000000 | 2.26 |
| $D_8$ | 6.46 | 324.53 | 0.000000 | 2.11 |
| $D_9$ | 7.85 | 400.77 | 0.000000 | 2.05 |
| $D_{10}$ | 4.96 | 267.21 | 0.000000 | 2.24 |

Detection of Power-Tail Behavior Using the $PT_{(\alpha=1.4)}$ Distribution

TABLE 7

1,000 Samples, $PT_{(\alpha = 1.4)}$ Distribution
$E(D) = 1.0$, $VI = 2.652841$, $P_E = 0.632305$, $\alpha_E = 3.57$, $\log(N) = 6.907755$

| $D_i$ | $V(D)$ | max $\{D_i\}$ | $P_D$ | $\alpha_D$ |
|---|---|---|---|---|
| $D_1$ | 118.25 | 258.48 | 0.000000 | 1.54 |
| $D_2$ | 22.26 | 372.03 | 0.000000 | 1.78 |
| $D_3$ | 3.85 | 306.09 | 0.000000 | 2.38 |
| $D_4$ | 19.46 | 229.85 | 0.000000 | 1.75 |
| $D_5$ | 64.45 | 353.93 | 0.000000 | 1.66 |
| $D_6$ | 11.40 | 247.26 | 0.000000 | 1.89 |
| $D_7$ | 3.51 | 260.89 | 0.000000 | 2.37 |
| $D_8$ | 19.00 | 324.53 | 0.000000 | 1.77 |
| $D_9$ | 6.74 | 400.77 | 0.000000 | 2.07 |
| $D_{10}$ | 5.02 | 267.21 | 0.000000 | 2.19 |

TABLE 8

10,000 Samples, $PT_{(\alpha = 1.4)}$ Distribution
$E(D) = 1.0$, $VI = 2.879695$, $P_E = 0.632305$, $\alpha_E = 4.15$, $\log(N) = 9.210340$

| $D_i$ | $V(D)$ | max $\{D_i\}$ | $P_D$ | $\alpha_D$ |
|---|---|---|---|---|
| $D_1$ | 60.14 | 235.33 | 0.000000 | 1.63 |
| $D_2$ | 42.34 | 523.58 | 0.000000 | 1.72 |
| $D_3$ | 14.39 | 172.18 | 0.000000 | 1.92 |
| $D_4$ | 14.53 | 381.25 | 0.000000 | 1.96 |
| $D_5$ | 10.14 | 122.16 | 0.000000 | 2.05 |
| $D_6$ | 39.98 | 383.89 | 0.000000 | 1.69 |
| $D_7$ | 16.04 | 203.57 | 0.000000 | 1.87 |
| $D_8$ | 223.19 | 1624.97 | 0.000000 | 1.53 |
| $D_9$ | 263.46 | 1717.48 | 0.000000 | 1.50 |
| $D_{10}$ | 203.37 | 1396.07 | 0.000000 | 1.58 |

TABLE 9

100,000 Samples, $PT_{(\alpha = 1.4)}$ Distribution
$E(D) = 1.0$, $VI = 4.865793$, $P_E = 0.632305$, $\alpha_E = 4.71$, $\log(N) = 11.512925$

| $D_i$ | $V(D)$ | max $\{D_i\}$ | $P_D$ | $\alpha_D$ |
|---|---|---|---|---|
| $D_1$ | 52.85 | 1704.16 | 0.000000 | 1.78 |
| $D_2$ | 1536.26 | 13593.72 | 0.000000 | 1.43 |
| $D_3$ | 43.50 | 1151.55 | 0.000000 | 1.79 |
| $D_4$ | 138.47 | 3224.55 | 0.000000 | 1.64 |
| $D_5$ | 30.34 | 535.07 | 0.000000 | 1.85 |
| $D_6$ | 59.30 | 1239.03 | 0.000000 | 1.70 |
| $D_7$ | 121.69 | 2333.67 | 0.000000 | 1.60 |
| $D_8$ | 424.51 | 4737.07 | 0.000000 | 1.49 |
| $D_9$ | 44.97 | 1019.50 | 0.000000 | 1.77 |
| $D_{10}$ | 74.32 | 1522.81 | 0.000000 | 1.68 |

Detection of Power-Tail Behavior using the $PT_{(\alpha 1.1)}$ Distribution

TABLE 10

1,000 Samples, $PT_{(\alpha = 1.4)}$ Distribution
$E(D) = 1.0$, $VI = 2.652841$, $P_E = 0.632305$, $\alpha_E = 3.57$, $\log(N) = 6.907755$

| $D_i$ | $V(D)$ | max $\{D_i\}$ | $P_D$ | $\alpha_D$ |
|---|---|---|---|---|
| $D_1$ | 33.14 | 70.30 | 0.000000 | 1.62 |
| $D_2$ | 29.62 | 76.08 | 0.000000 | 1.70 |
| $D_3$ | 37.54 | 90.81 | 0.000000 | 1.68 |
| $D_4$ | 19.30 | 52.46 | 0.000000 | 1.79 |
| $D_5$ | 30.69 | 66.55 | 0.000000 | 1.67 |
| $D_6$ | 17.66 | 49.07 | 0.000000 | 1.79 |
| $D_7$ | 38.44 | 76.87 | 0.000000 | 1.59 |
| $D_8$ | 26.26 | 47.59 | 0.000000 | 1.65 |
| $D_9$ | 24.88 | 47.04 | 0.000000 | 1.68 |
| $D_{10}$ | 37.20 | 91.78 | 0.000000 | 1.64 |

TABLE 11

10,000 Samples, $PT_{(\alpha = 1.4)}$ Distribution
$E(D) = 1.0$, $VI = 2.879695$, $P_E = 0.632305$, $\alpha_E = 4.15$, $\log(N) = 9.210340$

| $D_i$ | $V(D)$ | max $\{D_i\}$ | $P_D$ | $\alpha_D$ |
|---|---|---|---|---|
| $D_1$ | 61.59 | 217.80 | 0.000000 | 1.63 |
| $D_2$ | 215.24 | 719.95 | 0.000000 | 1.45 |
| $D_3$ | 40.31 | 214.79 | 0.000000 | 1.74 |
| $D_4$ | 48.77 | 213.91 | 0.000000 | 1.67 |
| $D_5$ | 239.59 | 879.78 | 0.000000 | 1.46 |
| $D_6$ | 121.76 | 480.78 | 0.000000 | 1.54 |
| $D_7$ | 463.36 | 1391.90 | 0.000000 | 1.46 |
| $D_8$ | 218.46 | 783.52 | 0.000000 | 1.47 |

TABLE 11-continued 10,000 Samples, $PT_{(\alpha\ =\ 1.4)}$ Distribution
$E(D) = 1.0$, $VI = 2.879695$, $P_E = 0.632305$, $\alpha_E = 4.15$, $\log(N) = 9.210340$

| $D_i$ | $V(D)$ | max $\{D_i\}$ | $P_D$ | $\alpha_D$ |
|---|---|---|---|---|
| $D_9$ | 224.51 | 922.68 | 0.000000 | 1.51 |
| $D_{10}$ | 308.97 | 1030.60 | 0.000000 | 1.45 |

TABLE 12

100,000 Samples, $PT_{(\alpha\ =\ 1.4)}$ Distribution
$E(D) = 1.0$, $VI = 4.865793$, $P_E = 0.632305$, $\alpha_E = 4.71$, $\log(N) = 11.512925$

| $D_i$ | $V(D)$ | max $\{D_i\}$ | $P_D$ | $\alpha_D$ |
|---|---|---|---|---|
| $D_1$ | 8188.39 | 23421.83 | 0.000000 | 1.30 |
| $D_2$ | 1617.91 | 7457.63 | 0.000000 | 1.37 |
| $D_3$ | 294.10 | 1852.44 | 0.000000 | 1.52 |
| $D_4$ | 405.06 | 2694.54 | 0.000000 | 1.49 |
| $D_5$ | 204.44 | 1269.99 | 0.000000 | 1.56 |
| $D_6$ | 1614.65 | 7591.66 | 0.000000 | 1.37 |
| $D_7$ | 152.68 | 1027.25 | 0.000000 | 1.62 |
| $D_8$ | 862.11 | 5390.93 | 0.000000 | 1.44 |
| $D_9$ | 2098.79 | 9041.88 | 0.000000 | 1.34 |
| $D_{10}$ | 1645.51 | 8110.06 | 0.000000 | 1.37 |

When the three tests were applied to the exponential distribution, no instances of power-tail behavior were detected: that is, the algorithms were 100% correct. When $\alpha$ was equal to 2.0, the algorithms detected 6.7% of the data sets as power-tail-distributed when the sample size was less than or equal to 10,000. When the sample size was 100,000, the algorithms were 100% correct in detecting that the data sets were not power-tail-distributed for $\alpha=2.0$. In general, the algorithms correctly classified the data as non-power-tail-distributed because the third analytic test ($A_3$) indicated that the distribution's tail was not consistent with power-tail behavior. When a was fixed to 1.4, the algorithms identified 80% of the data sets as power-tail-distributed when the sample size was less than or equal to 100,000. As expected, the algorithms generally improved in accuracy as the sample size increased. When at least 10,000 samples were used for $\alpha=1.4$, the algorithms correctly detected 95% of the data sets as power-tail-distributed. The algorithms correctly detected 100% of the data sets as power-tail-distributed when 100,000 samples were used in the data sets. When a was fixed to 1.1, 100% of the data sets were correctly identified as power-tail-distributed. These results are set forth in tables 13 through 24 as follows.

Algorithm Performance Using the Exponential Distribution

TABLE 13

1,000 Samples, Exponential Distribution

| $D_i$ | $A_1$ | $A_2$ | $A_3$ | $I_n$ |
|---|---|---|---|---|
| $D_1$ | U | U | U | $I_8$ |
| $D_2$ | U | U | U | $I_8$ |
| $D_3$ | U | U | U | $I_8$ |
| $D_4$ | U | U | U | $I_8$ |
| $D_5$ | U | U | U | $I_8$ |
| $D_6$ | U | U | U | $I_8$ |
| $D_7$ | U | U | U | $I_8$ |
| $D_8$ | U | U | U | $I_8$ |

TABLE 13-continued 1,000 Samples, Exponential Distribution

| $D_i$ | $A_1$ | $A_2$ | $A_3$ | $I_n$ |
|---|---|---|---|---|
| $D_9$ | U | U | U | $I_8$ |
| $D_{10}$ | U | U | U | $I_8$ |

TABLE 14

10,000 Samples, Exponential Distribution

| $D_i$ | $A_1$ | $A_2$ | $A_3$ | $I_n$ |
|---|---|---|---|---|
| $D_1$ | U | U | U | $I_8$ |
| $D_2$ | U | U | U | $I_8$ |
| $D_3$ | U | U | U | $I_8$ |
| $D_4$ | U | U | U | $I_8$ |
| $D_5$ | U | U | U | $I_8$ |
| $D_6$ | U | U | U | $I_8$ |
| $D_7$ | U | U | U | $I_8$ |
| $D_8$ | U | U | U | $I_8$ |
| $D_9$ | U | U | U | $I_8$ |
| $D_{10}$ | U | U | U | $I_8$ |

TABLE 15

100,000 Samples, Exponential Distribution

| $D_i$ | $A_1$ | $A_2$ | $A_3$ | $I_n$ |
|---|---|---|---|---|
| $D_1$ | U | U | U | $I_8$ |
| $D_2$ | U | U | U | $I_8$ |
| $D_3$ | U | U | U | $I_8$ |
| $D_4$ | U | U | U | $I_8$ |
| $D_5$ | U | U | U | $I_8$ |
| $D_6$ | U | U | U | $I_8$ |
| $D_7$ | U | U | U | $I_8$ |
| $D_8$ | U | U | U | $I_8$ |
| $D_9$ | U | U | U | $I_8$ |
| $D_{10}$ | U | U | U | $I_8$ |

Algorithm Performance Using the $PT_{(\alpha=2.0)}$ Distribution

TABLE 16

1,000 Samples, $PT_{(\alpha=2.0)}$ Distribution

| $D_i$ | $A_1$ | $A_2$ | $A_3$ | $I_n$ |
|---|---|---|---|---|
| $D_1$ | S | S | S | $I_1$ |
| $D_2$ | U | U | U | $I_8$ |
| $D_3$ | U | S | U | $I_6$ |
| $D_4$ | U | U | U | $I_6$ |
| $D_5$ | S | U | U | $I_8$ |
| $D_6$ | U | U | U | $I_4$ |
| $D_7$ | U | U | U | $I_4$ |
| $D_8$ | S | S | U | $I_8$ |
| $D_9$ | U | S | U | $I_8$ |
| $D_{10}$ | U | U | U | $I_8$ |

TABLE 17

10,000 Samples, $PT_{(\alpha=2.0)}$ Distribution

| $D_i$ | $A_1$ | $A_2$ | $A_3$ | $I_n$ |
|---|---|---|---|---|
| $D_1$ | S | S | S | $I_1$ |
| $D_2$ | S | S | U | $I_2$ |

TABLE 17-continued 10,000 Samples, $PT_{(\alpha=2.0)}$ Distribution

| $D_i$ | $A_1$ | $A_2$ | $A_3$ | $I_n$ |
|---|---|---|---|---|
| $D_3$ | S | U | U | $I_4$ |
| $D_4$ | S | S | U | $I_2$ |
| $D_5$ | S | U | U | $I_4$ |
| $D_6$ | S | S | U | $I_2$ |
| $D_7$ | S | S | U | $I_2$ |
| $D_8$ | S | S | U | $I_2$ |
| $D_9$ | S | S | U | $I_2$ |
| $D_{10}$ | S | S | U | $I_2$ |

TABLE 18

100,000 Samples, $PT_{(\alpha=2.0)}$ Distribution

| $D_i$ | $A_1$ | $A_2$ | $A_3$ | $I_n$ |
|---|---|---|---|---|
| $D_1$ | S | U | U | $I_4$ |
| $D_2$ | S | S | U | $I_2$ |
| $D_3$ | S | U | U | $I_4$ |
| $D_4$ | S | U | U | $I_4$ |
| $D_5$ | S | S | U | $I_2$ |
| $D_6$ | S | S | U | $I_2$ |
| $D_7$ | S | U | U | $I_4$ |
| $D_8$ | S | S | U | $I_2$ |
| $D_9$ | S | S | U | $I_2$ |
| $D_{10}$ | S | S | U | $I_2$ |

Algorithm Performance Using the $PT_{(\alpha=1.4)}$ Distribution

TABLE 19

1,000 Samples, $PT_{(\alpha=1.4)}$ Distribution

| $D_i$ | $A_1$ | $A_2$ | $A_3$ | $I_n$ |
|---|---|---|---|---|
| $D_1$ | S | S | S | $I_1$ |
| $D_2$ | S | S | S | $I_1$ |
| $D_3$ | U | S | U | $I_6$ |
| $D_4$ | S | S | S | $I_1$ |
| $D_5$ | S | S | S | $I_6$ |
| $D_6$ | S | S | S | $I_1$ |
| $D_7$ | U | S | U | $I_2$ |
| $D_8$ | S | S | S | $I_1$ |
| $D_9$ | S | S | U | $I_2$ |
| $D_{10}$ | S | S | U | $I_2$ |

TABLE 20

10,000 Samples, $PT_{(\alpha=1.4)}$ Distribution

| $D_i$ | $A_1$ | $A_2$ | $A_3$ | $I_n$ |
|---|---|---|---|---|
| $D_1$ | S | S | S | $I_1$ |
| $D_2$ | S | S | S | $I_1$ |
| $D_3$ | S | S | S | $I_1$ |
| $D_4$ | S | S | S | $I_1$ |
| $D_5$ | S | S | U | $I_2$ |
| $D_6$ | S | S | S | $I_1$ |
| $D_7$ | S | S | S | $I_1$ |
| $D_8$ | S | S | S | $I_1$ |
| $D_9$ | S | S | S | $I_1$ |
| $D_{10}$ | S | S | S | $I_1$ |

TABLE 21

100,000 Samples, $PT_{(\alpha=1.4)}$ Distribution

| $D_i$ | $A_1$ | $A_2$ | $A_3$ | $I_n$ |
|---|---|---|---|---|
| $D_1$ | S | S | S | $I_1$ |
| $D_2$ | S | S | S | $I_1$ |
| $D_3$ | S | S | S | $I_1$ |
| $D_4$ | S | S | S | $I_1$ |
| $D_5$ | S | S | S | $I_1$ |
| $D_6$ | S | S | S | $I_1$ |
| $D_7$ | S | S | S | $I_1$ |
| $D_8$ | S | S | S | $I_1$ |
| $D_9$ | S | S | S | $I_1$ |
| $D_{10}$ | S | S | S | $I_1$ |

Algorithm Performance Using the $PT_{(\alpha=1.1)}$ Distribution

TABLE 22

1,000 Samples, $PT_{(\alpha=1.1)}$ Distribution

| $D_i$ | $A_1$ | $A_2$ | $A_3$ | $I_n$ |
|---|---|---|---|---|
| $D_1$ | S | S | S | $I_1$ |
| $D_2$ | S | S | S | $I_1$ |
| $D_3$ | S | S | S | $I_1$ |
| $D_4$ | S | S | S | $I_1$ |
| $D_5$ | S | S | S | $I_1$ |
| $D_6$ | S | S | S | $I_1$ |
| $D_7$ | S | S | S | $I_1$ |
| $D_8$ | S | S | S | $I_1$ |
| $D_9$ | S | S | S | $I_1$ |
| $D_{10}$ | S | S | S | $I_1$ |

TABLE 23

10,000 Samples, $PT_{(\alpha=1.1)}$ Distribution

| $D_i$ | $A_1$ | $A_2$ | $A_3$ | $I_n$ |
|---|---|---|---|---|
| $D_1$ | S | S | S | $I_1$ |
| $D_2$ | S | S | S | $I_1$ |
| $D_3$ | S | S | S | $I_1$ |
| $D_4$ | S | S | S | $I_1$ |
| $D_5$ | S | S | S | $I_1$ |
| $D_6$ | S | S | S | $I_1$ |
| $D_7$ | S | S | S | $I_1$ |
| $D_8$ | S | S | S | $I_1$ |
| $D_9$ | S | S | S | $I_1$ |
| $D_{10}$ | S | S | S | $I_1$ |

TABLE 24

100,000 Samples, $PT_{(\alpha=1.1)}$ Distribution

| $D_i$ | $A_1$ | $A_2$ | $A_3$ | $I_n$ |
|---|---|---|---|---|
| $D_1$ | S | S | S | $I_1$ |
| $D_2$ | S | S | S | $I_1$ |
| $D_3$ | S | S | S | $I_1$ |
| $D_4$ | S | S | S | $I_1$ |
| $D_5$ | S | S | S | $I_1$ |
| $D_6$ | S | S | S | $I_1$ |
| $D_7$ | S | S | S | $I_1$ |
| $D_8$ | S | S | S | $I_1$ |
| $D_9$ | S | S | S | $I_1$ |
| $D_{10}$ | S | S | S | $I_1$ |

The Linear Algebraic Approach to Queueing Theory
For background information and notation relating to linear algebraic queuing theory (LAQT), see: Marcel F. Neuts,

*Matrix-Geometric Solutions in Stochastic Models, an Algorithmic Approach*, Johns Hopkins University Press, Baltimore and London, 1981; and L. Lipsky, *Queueing Theory: A Linear Algebraic Approach*, MacMillan and Company, New York, 1992; which are incorporated herein by reference. It is well known that any cumulative distribution function can be represented arbitrarily closely by an m dimensional vector-matrix pair, <p, B>, using the following formulas. Let X be a random variable greater than or equal to zero. Then its cumulative distribution function (c.d.f., also referred to as probability distribution function or P.D.F.) F(x) is given according to equation 619:

$$F(x)=P(X \leq x)=1-p \exp(-xB)\epsilon'. \qquad (619)$$

Its probability density function (p.d.f)j(x) is given according to equation 620:

$$f(x) = \frac{dF(x)}{dx} = p\exp(-xB)B\epsilon', \qquad (620)$$

wherein ε' is a column m-vector of all 1's, and according to equation 621:

$$p\varepsilon' = \sum_{j=1}^{m} p_j. \qquad (621)$$

The linear operator, Ψ, which maps any m×m matrix, X, into a scalar, is defined as equation 622:

$$\Psi[X]=p\,X\epsilon'. \qquad (622)$$

The Reliability Function R(x) for the service time is given by equation 623:

$$R(x)=1-F(x)=P(X>x)=\Psi[\exp(-xB)]. \qquad (623)$$

As shown by equation 624, it also follows that the nth moments satisfy:

$$E(X^n) = \int_0^\infty x^n f(x)\,dx = n!pV^n\varepsilon' = n!\Psi[V^n]. \qquad (624)$$

wherein V=B$^{-1}$. The Laplace Transform of f(x) is given by equation 625:

$$F^*(s) = \int_0^\infty e^{-sx}f(x)dx = pB[sI+B]^{-1}\varepsilon' = \Psi[(sI+V)^{-1}]. \qquad (625)$$

Functions which can be represented exactly in this way are called Matrix Exponential (ME) or Phase distributions. From equation 625 it can be shown that all finite dimensional representations have rational Laplace transforms (RLT).

LAQT Representations of Truncated Power-Tail Distributions (TPT-M's)

In general, simple power-tail distributions of the form of equation 601 are difficult to utilize for Laplace transforms and do not have a direct matrix representation. However, Greiner has developed a family of functions which emulate the power-tail distribution. These functions are described in M. Greiner, M. Jobmann, and L. Lipsky, "The Importance of Power-Tail Distributions for Telecommunications Traffic Models," *Operations Research*, 1999, which is incorporated herein by reference. This family of functions can be utilized in LAQT and in analytic models generally. The reliability function for a TPT-M distribution, as shown by equation 626, is as follows:

$$R_M(x) = \frac{1-\theta}{1-\theta^M}\sum_{n=0}^{M-1}\theta^n\exp\left(-\frac{\mu x}{\gamma^n}\right), \qquad (626)$$

where $0 < \theta < 1$ and $\gamma > 1$.

If the following limit function, as shown by equation 627, is defined as follows:

$$R(x) = \lim_{M\to\infty} R_M(x) = \frac{1-\theta}{1-\theta^M}\sum_{n=0}^{M-1}\theta^n\exp\left(-\frac{\mu x}{\gamma^n}\right), \qquad (627)$$

then R(x) satisfies equation 601, and α is related to θ and γ by equation 628:

$$\theta\gamma^\alpha = 1, \text{ or } \alpha = -\frac{\log(\theta)}{\log(\gamma)}. \qquad (628)$$

Furthermore, all moments are unbounded as M→∞, so according to equation 629:

$$E(X) = \lim_{M\to\infty} E(X_m^l) = \infty \text{ for } l \geq \alpha. \qquad (629)$$

The functions $R_M(x)$ are referred to as truncated power-tails or TPT-M distributions because, depending upon the size of M, they look like their limit function, the true power-tail R(x). But for some large x, depending upon M, they drop off exponentially. These functions are easy to manipulate algebraically. Furthermore, they are m-dimensional phase distributions whose vector-matrix representations, <p, B>, are given using the notation described in Lipsky, *Queueing Theory. A Linear Algebraic Approach*.

Various embodiments further include receiving or storing instructions and/or data implemented in accordance with the foregoing description upon a carrier medium. Suitable carrier media include memory media or storage media such as magnetic or optical media, e.g., disk or CD-ROM, as well as signals such as electrical, electromagnetic, or digital signals, conveyed via a communication medium such as networks 102 and 104 and/or a wireless link.

Although the system and method of the present invention have been described in connection with several embodiments, the invention is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A method for monitoring the performance of an enterprise, wherein the enterprise comprises one or more computer systems, the method comprising:

receiving a set of data points from said one or more computer systems, wherein said set of data points represents a series of measurements of one or more system resources of said one or more computer systems;

determining whether there is a power-tail behavior in said set of data points, comprising:

performing two or more analytic tests on said set of data points;
combining results of said analytic tests to determine a likelihood of said power-tail behavior;
modeling said enterprise based on said determining whether there is a power-tail behavior in said set of data points.

2. The method of claim 1, further comprising:
altering a configuration of said enterprise based on said determining whether there is a power-tail behavior in said set of data points.

3. The method of claim 1,
wherein said modeling said enterprise based on said determining whether there is power-tail behavior in said set of data points further comprises:
modifying a model of said enterprise.

4. The method of claim 1,
wherein said modeling said enterprise based on said determining whether there is a power-tail behavior in said set of data points further comprises:
displaying said likelihood of said power-tail behavior.

5. The method of claim 1,
wherein performing said analytic tests on said set of data points further comprises performing a first analytic test, a second analytic test, and a third analytic test on said set of data points;
wherein said combining results of said analytic tests to determine a likelihood of said power-tail behavior further comprises combining results of said first analytic test, said second analytic test, and said third analytic test to determine said likelihood of said power-tail behavior.

6. The method of claim 5,
wherein performing said first analytic test on said set of data points further comprises determining whether said set of data points exhibits large deviations from a mean of said data points.

7. The method of claim 5,
wherein performing said second analytic test on said set of data points further comprises determining whether said set of data points exhibits a high variance.

8. The method of claim 5,
wherein performing said third analytic test on said set of data points further comprises determining whether a set of largest data points of said set of data points exhibits properties consistent with large values in a tail portion of a power-tail distribution.

9. The method of claim 5,
wherein performing said first analytic test on said set of data points further comprises:
determining a substantially largest data point of said set of data points;
computing a probability $P_D$ that a random variable X is greater than or equal to said substantially largest data point;
computing a probability $P_E$ that said random variable X is greater than or equal to an expected value of a largest order statistic of an exponential distribution;
determining a tolerance factor;
determining whether said probability $P_D$ is less than or equal to said tolerance factor;
determining whether said probability $P_D$ is less than or equal to said probability $P_E$.

10. The method of claim 9,
wherein said determining whether said probability $P_D$ is less than or equal to said tolerance factor further comprises determining that said probability $P_D$ is less than or equal to said tolerance factor;
wherein said determining whether said probability $P_D$ is less than or equal to said probability $P_E$ further comprises determining that said probability $P_D$ is less than or equal to said probability $P_E$;
wherein performing said first analytic test further comprises:
determining that said first analytic test is successful.

11. The method of claim 9,
wherein said determining whether said probability $P_D$ is less than or equal to said tolerance factor further comprises determining that said probability $P_D$ is less than or equal to said tolerance factor;
wherein said determining whether said probability $P_D$ is less than or equal to said probability $P_E$ further comprises determining that said probability $P_D$ is not less than or equal to said probability $P_E$;
wherein performing said first analytic test further comprises:
determining that said first analytic test is unsuccessful.

12. The method of claim 9,
wherein said determining whether said probability $P_D$ is less than or equal to said tolerance factor further comprises determining that said probability $P_D$ is not less than or equal to said tolerance factor;
wherein said determining whether said probability $P_D$ is less than or equal to said probability $P_E$ further comprises determining that said probability $P_D$ is less than or equal to said probability $P_E$;
wherein performing said first analytic test further comprises:
determining that said first analytic test is unsuccessful.

13. The method of claim 9,
wherein said determining whether said probability $P_D$ is less than or equal to said tolerance factor further comprises determining that said probability $P_D$ is not less than or equal to said tolerance factor;
wherein said determining whether said probability $P_D$ is less than or equal to said probability $P_E$ further comprises determining that said probability $P_D$ is not less than or equal to said probability $P_E$;
wherein performing said first analytic test further comprises:
determining that said first analytic test is unsuccessful.

14. The method of claim 5,
wherein performing said second analytic test on said set of data points further comprises:
computing a power-tail variance index for a power-tail distribution with a power-tail index $\alpha$ of 2;
computing a variance of said set of data points;
determining whether said variance of said set of data points is greater than r equal to said power-tail variance index.

15. The method of claim 14,
wherein said determining whether said variance of said set of data points is greater than or equal to said power-tail variance index further comprises determining that said variance of said set of data points is greater than or equal to said power-tail variance index;
wherein performing said second analytic test further comprises:
determining that said second analytic test is successful.

16. The method of claim 14,
wherein said determining whether said variance of said set of data points is greater than or equal to said power-tail variance index further comprises determining that said variance of said set of data points is not greater than or equal to said power-tail variance index;

wherein performing said second analytic test further comprises:

determining that said second analytic test is unsuccessful.

17. The method of claim 5, wherein performing said third analytic test on said set of data points further comprises:

normalizing said set of data points such that an expected value of said set of data points is 1;

determining a substantially largest data point of said set of data points;

estimating a power-tail index $\alpha$ of said set of data points;

determining whether said power-tail index $\alpha$ of said set of data points is less than 2.

18. The method of claim 17, wherein said determining whether said power-tail index $\alpha$ of said set of data points is less than 2 further comprises determining that said power-tail index $\alpha$ of said set of data points is less than 2;

wherein performing said third analytic test further comprises:

determining that said third analytic test is successful.

19. The method of claim 17, wherein said determining whether said power-tail index $\alpha$ of said set of data points is less than 2 further comprises determining that said power-tail index $\alpha$ of said set of data points is not less than 2;

wherein performing said third analytic test further comprises:

determining that said third analytic test is unsuccessful.

20. The method of claim 5, wherein said determining whether there is a power-tail behavior in said set of data points further comprises:

determining that said first analytic test is unsuccessful;

determining that said second analytic test is unsuccessful;

determining that said third analytic test is unsuccessful;

wherein said combining results of said first analytic test, said second analytic test, and said third analytic test to determine said likelihood of said power-tail behavior further comprises:

concluding that said power-tail behavior is unlikely.

21. The method of claim 5, wherein said determining whether there is a power-tail behavior in said set of data points further comprises:

determining that said first analytic test is successful;

determining that said second analytic test is successful;

determining that said third analytic test is successful;

wherein said combining results of said first analytic test, said second analytic test, and said third analytic test to determine said likelihood of said power-tail behavior further comprises:

concluding that said power-tail behavior is likely.

22. The method of claim 5, wherein said determining whether there is a power-tail behavior in said set of data points further comprises:

determining that two of said three analytic tests are unsuccessful;

determining that one of said three analytic tests is successful;

wherein said combining results of said first analytic test, said second analytic test, and said third analytic test to determine said likelihood of said power-tail behavior further comprises:

concluding that said power-tail behavior is possible.

23. The method of claim 5, wherein said determining whether there is a power-tail behavior in said set of data points further comprises:

determining that one of said three analytic tests is unsuccessful;

determining that two of said three analytic tests are successful;

wherein said combining results of said first analytic test, said second analytic test, and said third analytic test to determine said likelihood of said power-tail behavior further comprises:

concluding that said power-tail behavior is possible.

24. The method of claim 1, wherein said data points are independent and identically distributed;

wherein said determining whether there is a power-tail behavior in said set of data points further comprises determining whether there is a renewal power-tail behavior in said set of data points.

25. A system for monitoring the performance of an enterprise, wherein the enterprise comprises one or more computer systems, the system comprising:

one or more agent computer systems;

a CPU;

a memory coupled to said CPU, wherein said memory stores one or more computer programs executable by the CPU, wherein said computer programs are executable to:

receive a set of data points from said one or more agent computer systems, wherein said set of data points represents a series of measurements of one or more system resources of said one or more agent computer systems;

determine whether there is a power-tail behavior in said set of data points, wherein said computer programs are further executable to:

perform two or more analytic tests on said set of data points;

combine results of said analytic tests to determine a likelihood of said power-tail behavior;

model said enterprise based on said determining whether there is a power-tail behavior in said set of data points.

26. The system of claim 25, wherein said computer programs are further executable to:

alter a configuration of said enterprise based on said determining whether there is a power-tail behavior in said set of data points.

27. The system of claim 25, wherein in said modeling said enterprise based on said determining whether there is a power-tail behavior in said set of data points, said computer programs are further executable to:

modify a model of said enterprise.

28. The system of claim 25, wherein in said modeling said enterprise based on said determining whether there is a power-tail behavior in said set of data points, said computer programs are further executable to:

display said likelihood of said power-tail behavior.

29. The system of claim 25, wherein in performing said analytic tests on said set of data points, said computer programs are further executable to perform a first analytic test, a second analytic test, and a third analytic test on said set of data points;

wherein in said combining results of said analytic tests to determine a likelihood of said power-tail behavior, said computer programs are further executable to combine results of said first analytic test, said second analytic test, and said third analytic test to determine said likelihood of said power-tail behavior.

30. The system of claim 29, wherein in performing said first analytic test on said set of data points, said computer programs are further executable to determine whether said set of data points exhibits large deviations from a mean of said data points.

31. The system of claim 29, wherein in performing said second analytic test on said set of data points, said computer programs are further executable to determine whether said set of data points exhibits a high variance.

32. The system of claim 29, wherein in performing said third analytic test on said set of data points, said computer programs are further executable to determine whether a set of largest data points of said set of data points exhibits properties consistent with large values in a tail portion of a power-tail distribution.

33. The system of claim 29, wherein in performing said first analytic test on said set of data points, said computer programs are further executable to:
  determine a substantially largest data point of said set of data points;
  compute a probability $P_D$ that a random variable X is greater than or equal to said substantially largest data point;
  compute a probability $P_E$ that said random variable X is greater than or equal to an expected value of a largest order statistic of an exponential distribution;
  determine a tolerance factor;
  determine whether said probability $P_D$ is less than or equal to said tolerance factor;
  determine whether said probability $P_D$ is less than or equal to said probability $P_E$.

34. The system of claim 33, wherein in said determining whether said probability $P_D$ is less than or equal to said tolerance factor, said computer programs are further executable to determine that said probability $P_D$ is less than or equal to said tolerance factor;

wherein in said determining whether said probability $P_D$ is less than or equal to said probability $P_E$, said computer programs are further executable to determine that said probability $P_D$ is less than or equal to said probability $P_E$;

wherein in performing said first analytic test, said computer programs are further executable to:
  determine that said first analytic test is successful.

35. The system of claim 33, wherein in said determining whether said probability $P_D$ is less than or equal to said tolerance factor, said computer programs are further executable to determine that said probability $P_D$ is less than or equal to said tolerance factor;

wherein said determining whether said probability $P_D$ is less than or equal to said probability $P_E$, said computer programs are further executable to determine that said probability $P_D$ is not less than or equal to said probability $P_E$;

wherein in performing said first analytic test, said computer programs are further executable to:
  determine that said first analytic test is unsuccessful.

36. The system of claim 33, wherein in said determining whether said probability $P_D$ is less than or equal to said tolerance factor, said computer programs are further executable to determine that said probability $P_D$ is not less than or equal to said tolerance factor;

wherein in said determining whether said probability $P_D$ is less than or equal to said probability $P_E$, said computer programs are further executable to determine that said probability $P_D$ is less than or equal to said probability $P_E$;

wherein in performing said first analytic test, said computer programs are further executable to:
  determine that said first analytic test is unsuccessful.

37. The system of claim 33, wherein in said determining whether said probability $P_D$ is less than or equal to said tolerance factor, said computer programs are further executable to determine that said probability $P_D$ is not less than or equal to said tolerance factor;

wherein in said determining whether said probability $P_D$ is less than or equal to said probability $P_E$, said computer programs are further executable to determine that said probability $P_D$ is not less than or equal to said probability $P_E$;

wherein in performing said first analytic test, said computer programs are further executable to:
  determine that said first analytic test is unsuccessful.

38. The system of claim 29, wherein in performing said second analytic test on said set of data points, said computer programs are further executable to:
  compute a power-tail variance index for a power-tail distribution with a power-tail index $\alpha$ of 2;
  compute a variance of said set of data points;
  determine whether said variance of said set of data points is greater than or equal to said power-tail variance index.

39. The system of claim 38, wherein in said determining whether said variance of said set of data points is greater than or equal to said power-tail variance index, said computer programs are further executable to determine that said variance of said set of data points is greater than or equal to said power-tail variance index;

wherein in performing said second analytic test, said computer programs are further executable to:
  determine that said second analytic test is successful.

40. The system of claim 38, wherein in said determining whether said variance of said set of data points is greater than or equal to said power-tail variance index, said computer programs are further executable to determine that said variance of said set of data points is not greater than or equal to said power-tail variance index;

wherein in performing said second analytic test, said computer programs are further executable to:
  determine that said second analytic test is unsuccessful.

41. The system of claim 29,
wherein in performing said third analytic test on said set of data points, said computer programs are further executable to:
normalize said set of data points such that an expected value of said set of data points is 1;
determine a substantially largest data point of said set of data points;
estimate a power-tail index $\alpha$ of said set of data points;
determine whether said power-tail index $\alpha$ of said set of data points is less than 2.

42. The system of claim 41,
wherein in said determining whether said power-tail index $\alpha$ of said set of data points is less than 2, said computer programs are further executable to determine that said power-tail index $\alpha$ of said set of data points is less than 2;
wherein in performing said third analytic test, said computer programs are further executable to:
determine that said third analytic test is successful.

43. The system of claim 41,
wherein in said determining whether said power-tail index $\alpha$ of said set of data points is less than 2, said computer programs are further executable to determine that said power-tail index $\alpha$ of said set of data points is not less than 2;
wherein in performing said third analytic test, said computer programs are further executable to:
determine that said third analytic test is unsuccessful.

44. The system of claim 29,
wherein in said determining whether there is a power-tail behavior in said set of data points, said computer programs are further executable to:
determine that said first analytic test is unsuccessful;
determine that said second analytic test is unsuccessful;
determine that said third analytic test is unsuccessful;
wherein in said combining results of said first analytic test, said second analytic test, and said third analytic test to determine said likelihood of said power-tail behavior, said computer programs are further executable to:
conclude that said power-tail behavior is unlikely.

45. The system of claim 29,
wherein in said determining whether there is a power-tail behavior in said set of data points, said computer programs are further executable to:
determine that said first analytic test is successful;
determine that said second analytic test is successful;
determine that said third analytic test is successful;
wherein in said combining results of said first analytic test, said second analytic test, and said third analytic test to determine said likelihood of said power-tail behavior, said computer programs are further executable to:
conclude that said power-tail behavior is likely.

46. The system of claim 29,
wherein in said determining whether there is a power-tail behavior in said set of data points, said computer programs are further executable to:
determine that two of said three analytic tests are unsuccessful;
determine that one of said three analytic tests is successful;
wherein in said combining results of said first analytic test, said second analytic test, and said third analytic test to determine said likelihood of said power-tail behavior, said computer programs are further executable to:
conclude that said power-tail behavior is possible.

47. The system of claim 29,
wherein in said determining whether there is a power-tail behavior in said set of data points, said computer programs are further executable to:
determine that one of said three analytic tests is unsuccessful;
determine that two of said three analytic tests are successful;
wherein in said combining results of said first analytic test, said second analytic test, and said third analytic test to determine said likelihood of said power-tail behavior, said computer programs are further executable to:
conclude that said power-tail behavior is possible.

48. The system of claim 25,
wherein said data points are independent and identically distributed;
wherein in said determining whether there is a power-tail behavior in said set of data points, said computer programs are further executable to determine whether there is a renewal power-tail behavior in said set of data points.

49. A carrier medium comprising program instructions for monitoring the performance of an enterprise, wherein the enterprise comprises one or more computer systems, wherein said program instructions are executable to implement:
receiving a set of data points from said one or more computer systems, wherein said set of data points represents a series of measurements of one or more system resources of said one or more computer systems;
determining whether there is a power-tail behavior in said set of data points, comprising:
performing two or more analytic tests on said set of data points;
combining results of said analytic tests to determine a likelihood of said power-tail behavior; and
modeling said enterprise based on said determining whether there is a power-tail behavior in said set of data points.

50. The carrier medium of claim 49, wherein said program instructions are further executable to implement:
altering a configuration of said enterprise based on said determining whether there is a power-tail behavior in said set of data points.

51. The carrier medium of claim 49,
wherein said modeling said enterprise based on said determining whether there is a power-tail behavior in said set of data points further comprises:
modifying a model of said enterprise.

52. The carrier medium of claim 49,
wherein said modeling said enterprise based on said determining whether there is a power-tail behavior in said set of data points further comprises:
displaying said likelihood of said power-tail behavior.

53. The carrier medium of claim 49,
wherein performing said analytic tests on said set of data points further comprises performing a first analytic test, a second analytic test, and a third analytic test on said set of data points;
wherein said combining results of said analytic tests to determine a likelihood of said power-tail behavior further comprises combining results of said first analytic test, said second analytic test, and said third analytic test to determine said likelihood of said power-tail behavior.

54. The carrier medium of claim 53,
wherein performing said first analytic test on said set of data points further comprises determining whether said set of data points exhibits large deviations from a mean of said data points.

55. The carrier medium of claim 53,
wherein performing said second analytic test on said set of data points further comprises determining whether said set of data points exhibits a high variance.

56. The carrier medium of claim 53,
wherein performing said third analytic test on said set of data points further comprises determining whether a set of largest data points of said set of data points exhibits properties consistent with large values in a tail portion of a power-tail distribution.

57. The carrier medium of claim 53,
wherein performing said first analytic test on said set of data points further comprises:
  determining a substantially largest data point of said set of data points;
  computing a probability $P_D$ that a random variable X is greater than or equal to said substantially largest data point;
  computing a probability $P_E$ that said random variable X is greater than or equal to an expected value of a largest order statistic of an exponential distribution;
  determining a tolerance factor;
  determining whether said probability $P_D$ is less than or equal to said tolerance factor;
  determining whether said probability $P_D$ is less than or equal to said probability $P_E$.

58. The carrier medium of claim 57,
wherein said determining whether said probability $P_D$ is less than or equal to said tolerance factor further comprises determining that said probability $P_D$ is less than or equal to said tolerance factor;
wherein said determining whether said probability $P_D$ is less than or equal to said probability $P_E$ further comprises determining that said probability $P_D$ is less than or equal to said probability $P_E$;
wherein performing said first analytic test further comprises:
  determining that said first analytic test is successful.

59. The carrier medium of claim 57,
wherein said determining whether said probability $P_D$ is less than or equal to said tolerance factor further comprises determining that said probability $P_D$ is less than or equal to said tolerance factor;
wherein said determining whether said probability $P_D$ is less than or equal to said probability $P_E$ further comprises determining that said probability $P_D$ is not less than or equal to said probability $P_E$;
wherein performing said first analytic test further comprises:
  determining that said first analytic test is unsuccessful.

60. The carrier medium of claim 57,
wherein said determining whether said probability $P_D$ is less than or equal to said tolerance factor further comprises determining that said probability $P_D$ is not less than or equal to said tolerance factor;
wherein said determining whether said probability $P_D$ is less than or equal to said probability $P_E$ further comprises determining that said probability $P_D$ is less than or equal to said probability $P_E$;
wherein performing said first analytic test further comprises:
  determining that said first analytic test is unsuccessful.

61. The carrier medium of claim 57,
wherein said determining whether said probability $P_D$ is less than or equal to said tolerance factor further comprises determining that said probability $P_D$ is not less than or equal to said tolerance factor;
wherein said determining whether said probability $P_D$ is less than or equal to said probability $P_E$ further comprises determining that said probability $P_D$ is not less than or equal to said probability $P_E$;
wherein performing said first analytic test further comprises:
  determining that said first analytic test is unsuccessful.

62. The carrier medium of claim 53,
wherein performing said second analytic test on said set of data points further comprises:
  computing a power-tail variance index for a power-tail distribution with a power-tail index $\alpha$ of 2;
  computing a variance of said set of data points;
  determining whether said variance of said set of data points is greater than or equal to said power-tail variance index.

63. The carrier medium of claim 62,
wherein said determining whether said variance of said set of data points is greater than or equal to said power-tail variance index further comprises determining that said variance of said set of data points is greater than or equal to said power-tail variance index;
wherein performing said second analytic test further comprises:
  determining that said second analytic test is successful.

64. The carrier medium of claim 62,
wherein said determining whether said variance of said set of data points is greater than or equal to said power-tail variance index further comprises determining that said variance of said set of data points is not greater than or equal to said power-tail variance index;
wherein performing said second analytic test further comprises:
  determining that said second analytic test is unsuccessful.

65. The carrier medium of claim 53,
wherein performing said third analytic test on said set of data points further comprises:
  normalizing said set of data points such that an expected value of said set of data points is 1;
  determining a substantially largest data point of said set of data points;
  estimating a power-tail index $\alpha$ of said set of data points;
  determining whether said power-tail index $\alpha$ of said set of data points is less than 2.

66. The carrier medium of claim 65,
wherein said determining whether said power-tail index $\alpha$ of said set of data points is less than 2 further comprises determining that said power-tail index $\alpha$ of said set of data points is less than 2;
wherein performing said third analytic test further comprises:
  determining that said third analytic test is successful.

67. The carrier medium of claim 65, wherein said determining whether said power-tail index α of said set of data points is less than 2 further comprises determining that said power-tail index α of said set of data points is not less than 2;

wherein performing said third analytic test further comprises:

determining that said third analytic test is unsuccessful.

68. The carrier medium of claim 53, wherein said determining whether there is a power-tail behavior in said set of data points further comprises:

determining that said first analytic test is unsuccessful;

determining that said second analytic test is unsuccessful;

determining that said third analytic test is unsuccessful;

wherein said combining results of said first analytic test, said second analytic test, and said third analytic test to determine said likelihood of said power-tail behavior further comprises:

concluding that said power-tail behavior is unlikely.

69. The carrier medium of claim 53, wherein said determining whether there is a power-tail behavior in said set of data points further comprises:

determining that said first analytic test is successful;

determining that said second analytic test is successful;

determining that said third analytic test is successful;

wherein said combining results of said first analytic test, said second analytic test, and said third analytic test to determine said likelihood of said power-tail behavior further comprises:

concluding that said power-tail behavior is likely.

70. The carrier medium of claim 53, wherein said determining whether there is a power-tail behavior in said set of data points further comprises:

determining that two of said three analytic tests are unsuccessful;

determining that one of said three analytic tests is successful;

wherein said combining results of said first analytic test, said second analytic test, and said third analytic test to determine said likelihood of said power-tail behavior further comprises:

concluding that said power-tail behavior is possible.

71. The carrier medium of claim 53, wherein said determining whether there is a power-tail behavior in said set of data points further comprises:

determining that one of said three analytic tests is unsuccessful;

determining that two of said three analytic tests are successful;

wherein said combining results of said first analytic test, said second analytic test, and said third analytic test to determine said likelihood of said power-tail behavior further comprises:

concluding that said power-tail behavior is possible.

72. The carrier medium of claim 49, wherein said data points are independent and identically distributed;

wherein said determining whether there is a power-tail behavior in said set of data points further comprises determining whether there is a renewal power-tail behavior in said set of data points.

73. The carrier medium of claim 49, wherein said carrier medium is a storage medium.

\* \* \* \* \*